(12) United States Patent
Prasad et al.

(10) Patent No.: US 11,400,824 B2
(45) Date of Patent: Aug. 2, 2022

(54) ELECTRICAL PROPULSION SYSTEM ARCHITECTURE

(71) Applicant: GM Global Technology Operations LLC, Detroit, MI (US)

(72) Inventors: Rashmi Prasad, Troy, MI (US); Chandra S. Namuduri, Troy, MI (US); Suresh Gopalakrishnan, Troy, MI (US); Thomas W. Nehl, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 257 days.

(21) Appl. No.: 16/915,296

(22) Filed: Jun. 29, 2020

(65) Prior Publication Data

US 2021/0402887 A1 Dec. 30, 2021

(51) Int. Cl.
*B60L 53/60* (2019.01)
*B60L 58/18* (2019.01)
*B60L 50/60* (2019.01)
*B60L 53/14* (2019.01)
*H02J 7/00* (2006.01)
*B60L 53/10* (2019.01)

(52) U.S. Cl.
CPC .............. *B60L 53/60* (2019.02); *B60L 50/60* (2019.02); *B60L 53/11* (2019.02); *B60L 53/14* (2019.02); *B60L 58/18* (2019.02); *H02J 7/0068* (2013.01); *H02J 7/00302* (2020.01); *B60L 2240/42* (2013.01); *B60L 2270/20* (2013.01); *H02J 2310/48* (2020.01)

(58) Field of Classification Search
CPC .......... B60L 53/11; B60L 53/14; B60L 53/00; B60L 53/10; B60L 58/12; B60L 58/15; B60L 2270/20; H02J 2310/48; H02J 7/00; H02J 7/0026; H02J 7/00302; H02J 7/0031; H02J 7/0068
See application file for complete search history.

(56) References Cited

U.S. PATENT DOCUMENTS

| | | | |
|---|---|---|---|
| 2017/0028857 A1* | 2/2017 | Gonzales | H02J 1/00 |
| 2019/0199108 A1* | 6/2019 | Hiroe | B60L 53/14 |
| 2020/0274375 A1* | 8/2020 | Griffiths | H02J 7/0029 |

* cited by examiner

*Primary Examiner* — Ryan Johnson
(74) *Attorney, Agent, or Firm* — Vivacqua Crane, PLLC

(57) ABSTRACT

A method of controlling fast charging of at least one battery pack within a high voltage electrical propulsion system includes identifying an operating condition, wherein the operating condition is one of charging mode and propulsion mode, and, when the electrical system is in charging mode, initiating charging of the at least one battery pack, terminating charging of the at least one battery pack and connecting the at least one battery pack to power components of the electrical propulsion system when there is a request to terminate charging of the at least one battery pack, and terminating charging of the at least one battery pack and connecting the at least one battery pack to power components of the electrical propulsion system when there is no request to terminate charging of the at least one battery pack and the charging of the at least one battery pack is complete.

17 Claims, 10 Drawing Sheets

ELECTRICAL PROPULSION SYSTEM ARCHITECTURE

INTRODUCTION

The present disclosure relates to an electrical propulsion system architecture and method of controlling an electrical propulsion system architecture.

Existing electrical propulsion system architectures employ high voltage electromechanical relays that are bulky, weighing half a kilogram or more and have slow switching speeds exceeding 10 ms. Further, such electromechanical relays are prone to contact welding during high current switching and contact bounce due to mechanical shock and/or vibration. Electromechanical relays have mechanical moving parts, and are therefore prone to degradation after prolonged use during the lifecycle of the electrical propulsion system. Additionally, existing electrical propulsion system architectures have long charging times.

Thus, while current electrical propulsion systems achieve their intended purpose, there is a need for an improved electrical propulsion system architecture and method of operating such electrical propulsion system architecture that provides a configuration enabling direct current fast charging and incorporates solid state switches that have faster response time than electromechanical relays, have no moving parts and thus have no orientation issues or degradation issues over the lifecycle of the system, and are not prone to contact welding or contact bounce.

SUMMARY

According to several aspects of the present disclosure, a method of controlling fast charging of at least one battery pack within a high voltage electrical propulsion system for an electric vehicle includes identifying an operating condition of the electrical propulsion system, wherein the operating condition is one of charging mode, wherein at least one battery pack of the electrical propulsion system is being charged and propulsion mode, wherein power from at least one battery pack is routed to electrical power components of the electrical propulsion system; and when the electrical system is in charging mode, actuating a first plurality of switches to a closed state and actuating a second plurality of switches to an open state to initiate charging of at least one battery pack, actuating the first plurality of switches to an open state and actuating the second plurality of switches to a closed state to terminate charging of at least one battery pack and connect at least one battery pack to power components of the electrical propulsion system when there is a request to terminate charging of the at least one battery pack, and actuating the first plurality of switches to an open state and actuating the second plurality of switches to a closed state to terminate charging of at least one battery pack and connect at least one battery pack to power components of the electrical propulsion system when there is no request to terminate charging of at least one battery pack and the charging of the at least one battery pack is complete.

According to another aspect, the method further includes, when the high voltage electrical propulsion system is in propulsion mode, actuating the first plurality of switches to an open state and actuating the second plurality of switches to a closed state to connect the at least one battery pack to power components of the electrical propulsion system.

According to another aspect, at least one battery pack includes a first battery pack and a second battery pack, and the operating condition is one of a first charging mode, a second charging mode, and propulsion mode, the method further including, when the electrical system is in the first charging mode, charging the first and second battery packs in the first charging mode, terminating the first charging mode when there is a request to terminate the first charging mode, and terminating the first charging mode when there is no request to terminate the first charging mode and the charging of the first and second battery packs in the first charging mode is complete.

According to another aspect, charging the first and second battery packs in the first charging mode includes actuating a first plurality of switches to a closed state and actuating a second plurality of switches to an open state to initiate the first charging mode of the first and second battery packs, and terminating the first charging mode includes actuating all of the first and second plurality of switches to the open state to terminate the first charging mode.

According to another aspect, the method further includes, when the high voltage electrical propulsion system is in the second charging mode, charging the first and second battery packs in the second charging mode, terminating the second charging mode when there is a request to terminate the second charging mode, and terminating the second charging mode when there is no request to terminate the second charging mode and the charging of the first and second battery packs in the second charging mode is complete.

According to another aspect, charging the first and second battery packs in the second charging mode includes actuating a third plurality of switches to a closed state and actuating a fourth plurality of switches to an open state to initiate the second charging mode of the first and second battery packs, and terminating the second charging mode includes actuating all of the third and fourth plurality of switches to the open state to terminate the second charging mode.

According to another aspect, the method further includes, when the high voltage electrical propulsion system is in propulsion mode, monitoring a state of charge of each of the first and second battery packs, providing power to power components within the electric vehicle from the first battery pack when the state of charge of the first battery pack is greater than the state of charge of the second battery pack, and providing power to power components within the electric vehicle from the second battery pack when the state of charge of the second battery pack is greater than the state of charge of the first battery pack.

According to another aspect, the method further includes providing power to power components within the electric vehicle from only the first battery pack when both of the first and second battery packs are healthy, power demand of the electric vehicle does not exceed a pre-determined threshold value, a delta between the state of charge of the first battery pack and the second battery pack exceeds a pre-determined threshold, and the state of charge of the first battery pack is greater than the state of charge of the second battery pack, and providing power to power components within the electric vehicle from only the second battery pack when both of the first and second battery packs are healthy, power demand of the electric vehicle does not exceed a pre-determined threshold value, the delta between the state of charge of the first battery pack and the second battery pack exceeds a pre-determined threshold, and the state of charge of the second battery pack is greater than the state of charge of the first battery pack.

According to another aspect, the pre-determined threshold for the delta between the state of charge of the first battery pack and the second battery pack is between 0% and 10%.

According to another aspect, the method further includes obtaining temperature, voltage and current information for cells within the first and second battery packs from sensors within the first and second battery packs, calculating voltage and current within each of the first and second battery packs, and estimating the state of charge of each of the first and second battery packs.

According to another aspect, providing power to power components within the electric vehicle from only the first battery pack further includes actuating a fifth plurality of switches to an open state and actuating a sixth plurality of switches to a closed state to provide power to power components within the electric vehicle from the first battery pack and to disconnect power components within the electric vehicle from the second battery pack, and providing power to power components within the electric vehicle from only the second battery pack further includes actuating a seventh plurality of switches to an open state and actuating an eighth plurality of switches to a closed state to provide power to power components within the electric vehicle from the second battery pack and to disconnect power components within the electric vehicle from the first battery pack.

According to another aspect, the method further includes, when the power demand of the electric vehicle exceeds the pre-determined threshold value, actuating the first plurality of switches to an open position and actuating the second plurality of switches to a closed state to provide power to power components within the electric vehicle from both the first battery pack and the second battery pack.

According to another aspect, the method further includes, when the power demand of the electric vehicle does not exceed the pre-determined threshold value and the delta between the state of charge of the first battery pack and the second battery pack does not exceed the pre-determined threshold, actuating the first plurality of switches to an open position and actuating the second plurality of switches to a closed state to provide power to power components within the electric vehicle from both the first battery pack and the second battery pack.

According to another aspect, the method further includes, when the high voltage electrical propulsion system is in propulsion mode and one of the first and second battery packs is not healthy, setting a diagnostic code, providing power to power components within the electric vehicle from the first battery pack and disconnecting power components within the electric vehicle from the second battery pack when the first battery pack is healthy, and providing power to power components within the electric vehicle from the second battery pack and disconnecting power components within the electric vehicle from the first battery pack when the first battery pack is not healthy.

According to several aspects of the present disclosure, a high voltage electrical propulsion system architecture for an automotive vehicle includes a direct current fast charging unit, a plurality of power components, at least one battery pack, and at least one switch adapted to selectively connect the at least one battery pack to one of the direct current fast charging unit and the power components within the automotive vehicle, wherein, at least one of the at least one switch is a solid-state switch in functional engagement with a current sensor, the solid-state switch and the current sensor adapted to precisely limit a fault current of the solid-state switch, the solid-state switch further adapted to allow ramping of the pulse width modulation (PWM) duty cycle of the control signal to limit the inrush of current when the at least one battery pack is initially connected to a load with capacitive input.

According to another aspect, the at least one switch includes a first plurality of switches, the first plurality of switches defining a charging circuit when each of the first plurality of switches are closed, and a second plurality of switches, the second plurality of switches defining a power circuit when each of the second plurality of switches are closed.

According to another aspect, the high voltage electrical propulsion system architecture includes at least one hybrid switch comprising a solid-state switch in parallel with a mechanical contact switch.

According to another aspect, at least one of the at least one switch is a single pole double throw mechanical switch.

According to another aspect, the high voltage electrical propulsion system architecture further includes a dedicated pre-charge circuit.

According to another aspect, the at least one battery pack includes a first battery pack and a second battery pack, and the electrical propulsion system is adapted to operate in one of an 800 volt charging mode, a 400 volt charging mode and a propulsion mode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
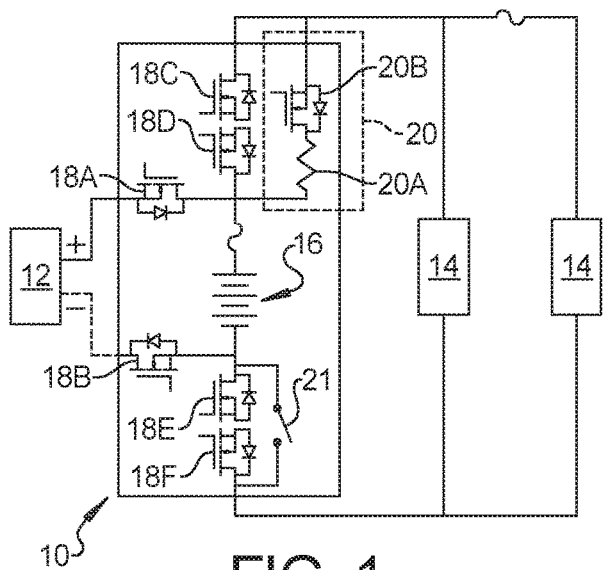
FIG. 1 is a schematic view of a high voltage electrical propulsion and DC Fast Charging system architecture according to an exemplary embodiment of the present disclosure.

Referring to FIG. 1, a high voltage electrical propulsion and DC Fast charging system architecture 10 for an automotive vehicle according to an exemplary embodiment of the present disclosure includes a direct current fast charging unit 12, a plurality of power components 14, at least one battery pack 16, and at least one switch 18 adapted to selectively connect the at least one battery pack 16 to one of the direct current fast charging unit 12 and the power components 14 within the automotive vehicle. A high voltage electrical propulsion system operates on a voltage that is at least 60 volts.

Power components within the automotive vehicle are those typically found in automobiles, and particularly in electrified automobiles, such as, but not limited to, traction power inverter module (TPIM), accessory power module (APM), air-conditioning compressor module (ACCM), and other integrated power electronics (IPE).

In the exemplary embodiment shown in FIG. 1, the at least one switch 18 includes a first plurality of switches 18A, 18B and a second plurality of switches 18C, 18D, 18E, 18F. The first plurality of switches 18A, 18B define a charging circuit when each of the first plurality of switches 18A, 18B are closed. When the first plurality of switches 18A, 18B are closed, the at least one battery pack 16 is connected to the direct current fast charging unit 12 so the at least one battery pack 16 can be charged by the direct current fast charging unit 12. When the at least one battery pack 16 is being charged by the direct current fast charging unit 12, the second plurality of switches 18C, 18D, 18E, 18F are open, so that the at least one battery pack 16 is disconnected from the power components 14.

The second plurality of switches 18C, 18D, 18E, 18F define a power circuit when each of the second plurality of switches 18C, 18D, 18E, 18F are closed. When the second plurality of switches 18C, 18D, 18E, 18F are closed, the at least one battery pack 16 is connected to the power components 14 within the vehicle to provide power to the power components 14. When the at least one battery pack 16 is connected to the power components 14, the first plurality of switches 18A, 18B are open, to that the at least one battery pack 16 is disconnected from the direct current fast charging unit 12.

The switches 18A, 18B, 18C, 18D, 18E, 18F are electronic solid-state switches. The switches 18A, 18B, 18C, 18D, 18E, 18F may be a semiconductor field-effect transistor (MOSFET). The MOSFET may include silicon carbide or other suitable semiconductors materials, such as Silicon, Silicon Carbide, Gallium Nitride, and Gallium Oxides. One advantage of the use of solid-state switches is that the switches 18A, 18B, 18C, 18D, 18E, 18F can be "tuned" to adjust the amount of current required to trip the switch, thereby allowing the sensitivity of the switch to be adjusted for a particular application. The solid-state switches have no mechanically moving parts thereby improving the reliability.

Additionally, the switches may be uni-directional or bi-directional. For example, referring again to FIG. 1, switch 18A is a uni-directional switch adapted to allow current to flow from the direct current fast charging unit to the electrical system. Switches 18C and 18D form a bi-directional pair, wherein switch 18C is adapted to allow current to flow in one direction and switch 18D is adapted to allow current to flow in the opposite direction. A hybrid switch may be used in place of either a single uni-directional switch or a bi-directional pair. Referring again to FIG. 1, solid-state switches 18E and 18F are connected in parallel with a mechanical switch 21. The solid-state switches 18E, 18F can be accurately sized to carry only the accessory load currents when the mechanical switch 21 is open.

As shown in FIG. 1, the high voltage electrical propulsion system architecture 10 includes a dedicated pre-charge circuit 20. The dedicated pre-charge circuit 20 includes a pre-charge resistor 20A and a pre-charge switch 20B. When the at least one battery pack 16 is initially connected to a load with capacitive input, there is an inrush current flowing in the circuit as the load capacitor gets charged to the battery voltage. This inrush current can be very high and may damage the switch and the load capacitor. The pre-charge circuit 20 limits the inrush current to prevent damage to components.

Figure 3:
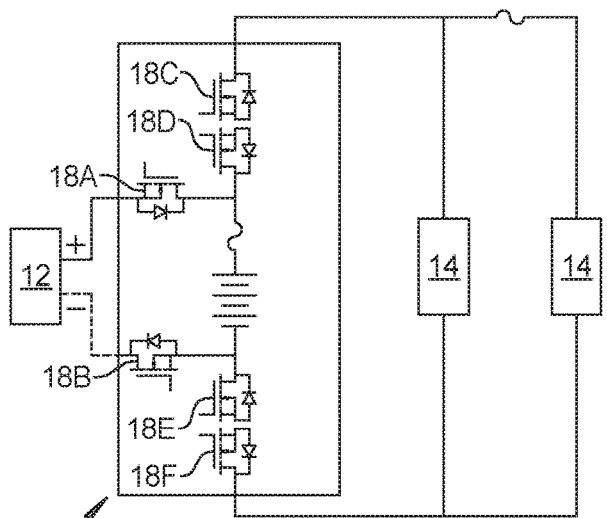
FIG. 3 is a schematic view of a variation of the high voltage electrical propulsion system architecture shown in FIG. 1, wherein the high voltage electrical propulsion system architecture does not have a dedicated pre-charge circuit.

Referring to FIG. 3, another exemplary embodiment of a high voltage electrical propulsion system architecture 34 is a variation of the electrical propulsion system architecture 10, and does not include a dedicated pre-charge circuit 20. The function of the pre-charge circuit 20 is integrated within the high speed switching capable solid-state switches 18 by ramping the pulse width modulation (PWM) duty cycle of the control signal from 0% to 100% over a pre-determined time interval.

Figure 2:
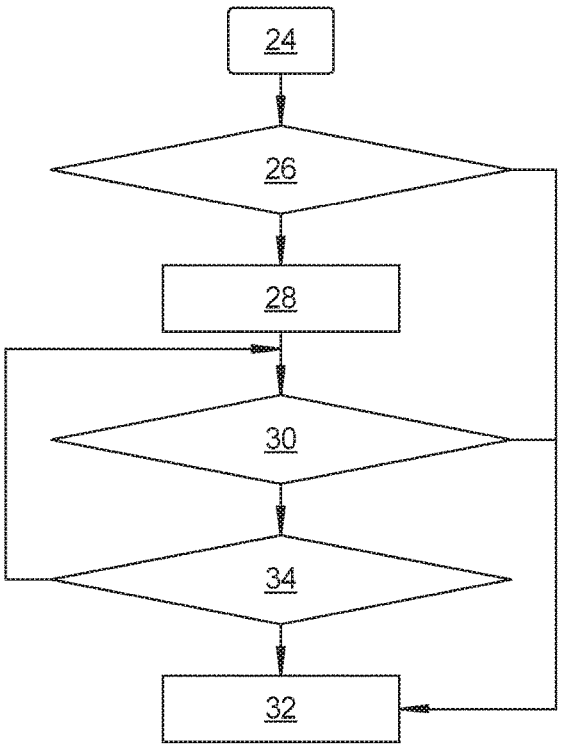
FIG. 2 is a flow-chart illustration of a method of operating the high voltage electrical propulsion system architecture shown in FIG. 1.

Referring to FIG. 2, a method 22 of controlling the high voltage electrical propulsion system shown in FIG. 1 is illustrated. Beginning at block 24 and moving to block 26, the method includes identifying an operating condition of the high voltage electrical propulsion system 10. The operating condition is one of charging mode, wherein the at least one battery pack 16 of the high voltage electrical propulsion system 10 is being charged and propulsion mode, wherein power from the at least one battery pack 16 is routed to electrical power components 14 of the high voltage electrical propulsion system 10.

If the high voltage electrical propulsion system 10 is in charging mode, moving to block 28, the first plurality of switches 18A, 18B are actuated to a closed position, and the second plurality of switches 18C, 18D, 18E, 18F are actuated to an open position. When the first plurality of switches 18A, 18B are closed, the at least one battery pack 16 is connected to the direct current fast charging unit 12 so the at least one battery pack 16 can be charged by the direct current fast charging unit 12. When the second plurality of switches 18C, 18D, 18E, 18F are open, the at least one battery pack 16 is disconnected from the power components 14.

Further, when the high voltage electrical propulsion system 10 is in charging mode, moving to block 30, if there is a request to the system to terminate charging of the at least one battery pack 16, moving on to block 32, the first plurality of switches 18A, 18B are actuated to an open state and the second plurality of switches are actuated to a closed state to terminate charging of the at least one battery pack 16 and connect the at least one battery pack 16 to the power components 14 of the electrical propulsion system 10.

If there is no request to terminate charging of the at least one battery pack 16, moving on to block 34, if charging of the at least one battery pack 16 is complete, moving on to block 32, the first plurality of switches 18A, 18B are actuated to an open state and the second plurality of switches are actuated to a closed state to terminate charging of the at least one battery pack 16 and connect the at least one battery pack 16 to the power components 14 of the electrical propulsion system 10.

If charging of the at least one battery pack 16 is not complete, then charging of the at least one battery pack 16 will continue until either there is a request to terminate charging or until the charging of the at least one battery pack is complete.

Moving back to block 26, if the high voltage electrical propulsion system 10 is in propulsion mode, moving on to block 32, the first plurality of switches 18A, 18B are actuated to an open state and the second plurality of switches are actuated to a closed state to terminate charging of the at least one battery pack 16 and connect the at least one battery pack 16 to the power components 14 of the electrical propulsion system 10.

Figure 4:
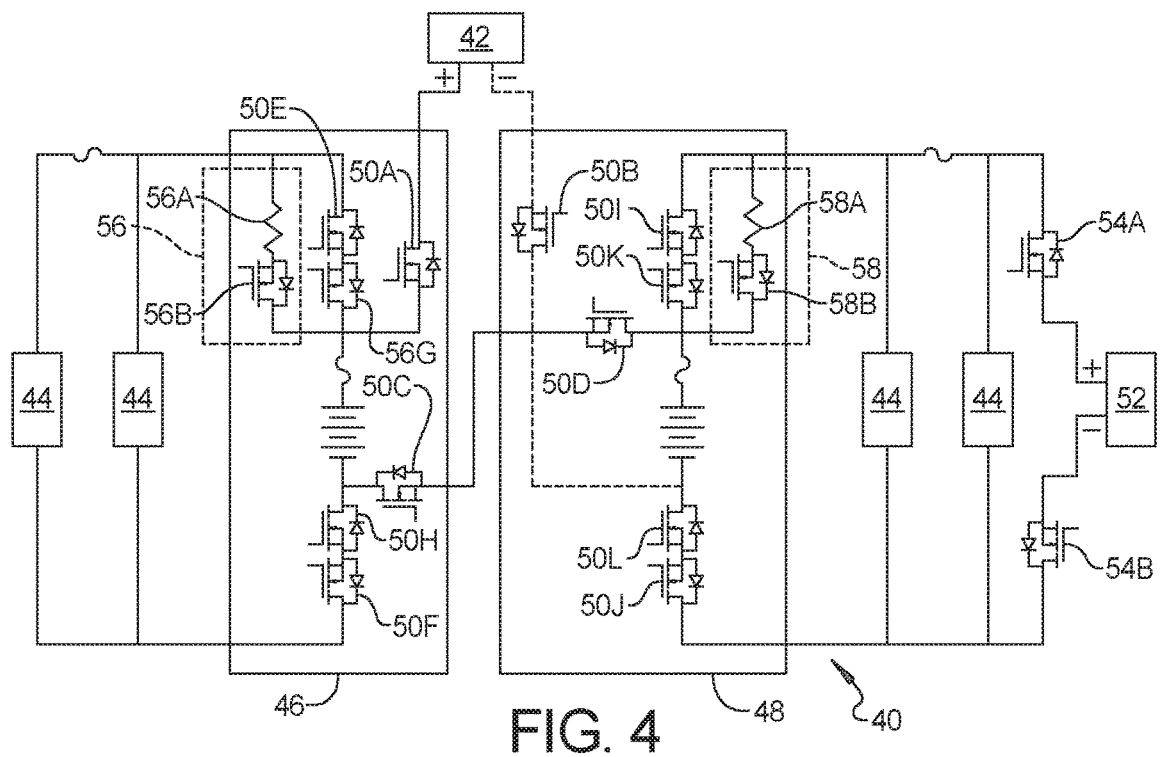
FIG. 4 is a schematic view of a high voltage electrical propulsion system architecture according to another exemplary embodiment of the present disclosure.

Referring to FIG. 4, a high voltage electrical propulsion system architecture 40 for an automotive vehicle according to another exemplary embodiment of the present disclosure includes a direct current fast charging unit 42, a plurality of power components 44, a first battery pack 46, a second battery pack 48 and at least one switch 50 adapted to selectively connect the first and second battery packs 46, 48 to one of the direct current fast charging unit 42 and the power components 44 within the automotive vehicle.

Power components 44 within the automotive vehicle are those typically found in automobiles, and particularly in electrified automobiles, such as, but not limited to, front power inverter module (FPIM), right power inverter module (RPIM), left power inverter module (LPIM), and other integrated power electronics (IPE). The high voltage electrical propulsion system architecture 40 shown in FIG. 4 further includes an on-board charger module 52, and optional switches 54A, 54B that selectively connect the on-board charger module 52 to the system.

In the exemplary embodiment shown in FIG. 4, the at least one switch 50 includes a first plurality of switches 50A, 50B, 50C, 50D and a second plurality of switches 50E, 50F, 50G, 50H, 50I, 50J, 50K, 50L. The first plurality of switches 50A, 50B, 50C, 50D define a charging circuit when each of the first plurality of switches 50A, 50B, 50C, 50D are closed. When the first plurality of switches 50A, 50B, 50C, 50D are closed, the first and second battery packs 46, 48 are connected to the direct current fast charging unit 42 so the first and second battery packs 46, 48 can be charged by the direct current fast charging unit 42 in a first charging mode which is 800 v charging. When the first and second battery packs 46, 48 are being charged by the direct current fast charging unit 42 in the first charging mode, the second plurality of switches 50E, 50F, 50G, 50H, 50I, 50J, 50K, 50L are open.

A third plurality of switches includes switches 50A, 50B, 50E, 50F, 50G, 50H, 50I, 50J, 50K, 50L and a fourth plurality of switches includes 50C, 50D. The third plurality of switches 50A, 50B, 50E, 50F, 50G, 50H, 50I, 50J, 50K, 50L define a charging circuit when each of the third plurality of switches 50A, 50B, 50E, 50F, 50G, 50H, 50I, 50J, 50K, 50L, are closed. When the third plurality of switches 50A, 50B, 50E, 50F, 50G, 50H, 50I, 50J, 50K, 50L are closed, the first and second battery packs 46, 48 are connected to the direct current fast charging unit 42 so the first and second battery packs 46, 48 can be charged by the direct current fast charging unit 42 in a second charging mode which is 400 v charging. When the first and second battery packs 46, 48 are being charged by the direct current fast charging unit 42 in the second charging mode, the fourth plurality of switches 50C, 50D are open.

The switches 50A-50L are electronic solid-state switches. The switches 50A-50L may be a semiconductor field-effect transistor (MOSFET). The MOSFET may include silicon carbide or other suitable semiconductors materials, such as Silicon, Silicon Carbide, Gallium Nitride, and Gallium Oxides. One advantage of the use of solid-state switches is that the switches 50A-50L can be "tuned" to adjust the amount of current required to trip the switch, thereby allowing the sensitivity of the switch to be adjusted for a particular application.

Additionally, the switches may be uni-directional or bi-directional. For example, referring again to FIG. 4, switch 50C is a uni-directional switch adapted to allow current to flow in one direction. 50C and 50D can also be replaced by bidirectional switches. Switches 50H and 50F form a bi-directional pair, wherein switch 50H is adapted to allow current to flow in one direction and switch 50F is adapted to allow current to flow in the opposite direction. The same is true of switch pairs 50G/50E, 50I/50K, and 50L/50J.

As shown in FIG. 4, the high voltage electrical propulsion system architecture 40 includes a dedicated pre-charge circuit 56 for the first battery pack 46, and a dedicated pre-charge circuit 58 for the second battery pack 48. The dedicated pre-charge circuit 56 for the first battery pack 46 includes a pre-charge resistor 56A and a pre-charge switch 56B. The dedicated pre-charge circuit 58 for the first battery pack 48 includes a pre-charge resistor 58A and a pre-charge switch 58B which could be unidirectional or bidirectional. When either of the first and second battery packs 46, 48 is initially connected to a load with capacitive input, there is an inrush current flowing in the circuit as the load capacitor gets charged to the battery voltage. This inrush current can be very high and may damage the switch and the load capacitor. The pre-charge circuits 56, 58 limit the inrush current within the first and second battery packs 46, 48 to prevent damage to components.

Figure 8:
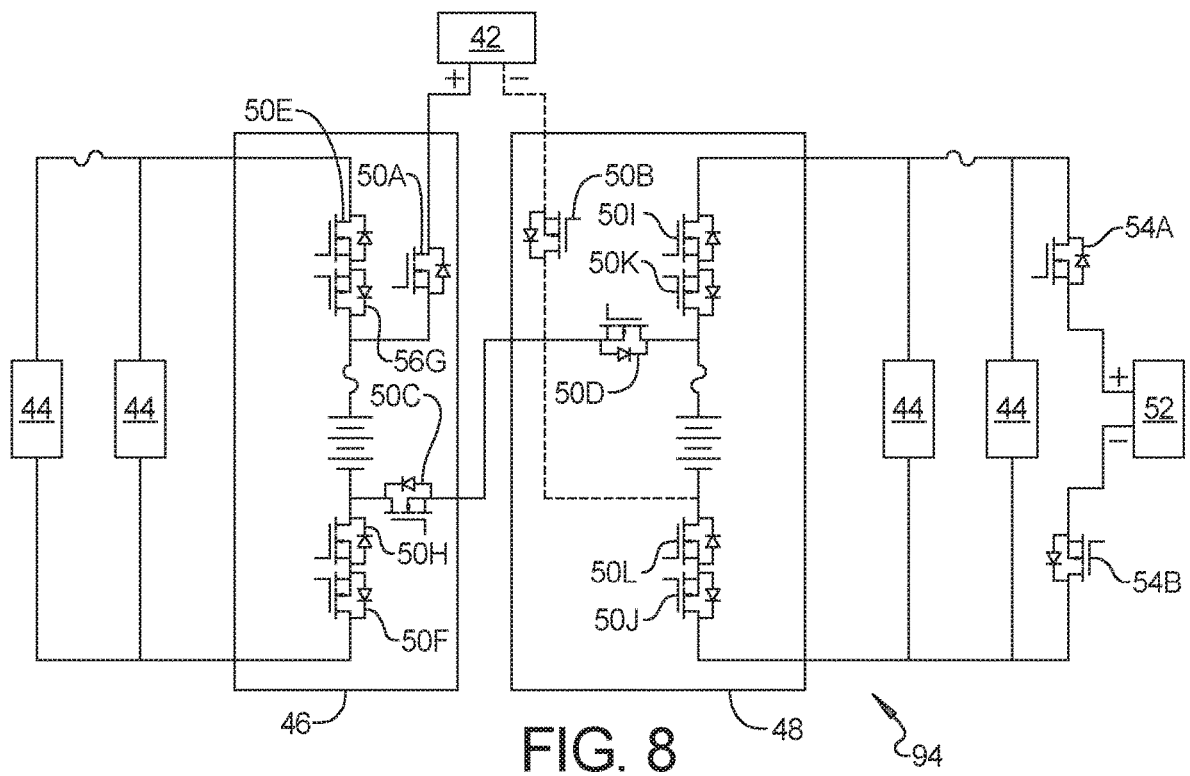
FIG. 8 is a schematic view of a variation of the high voltage electrical propulsion system architecture shown in FIG. 4, wherein the high voltage electrical propulsion system architecture does not have a dedicated pre-charge circuit.
Figure 9:
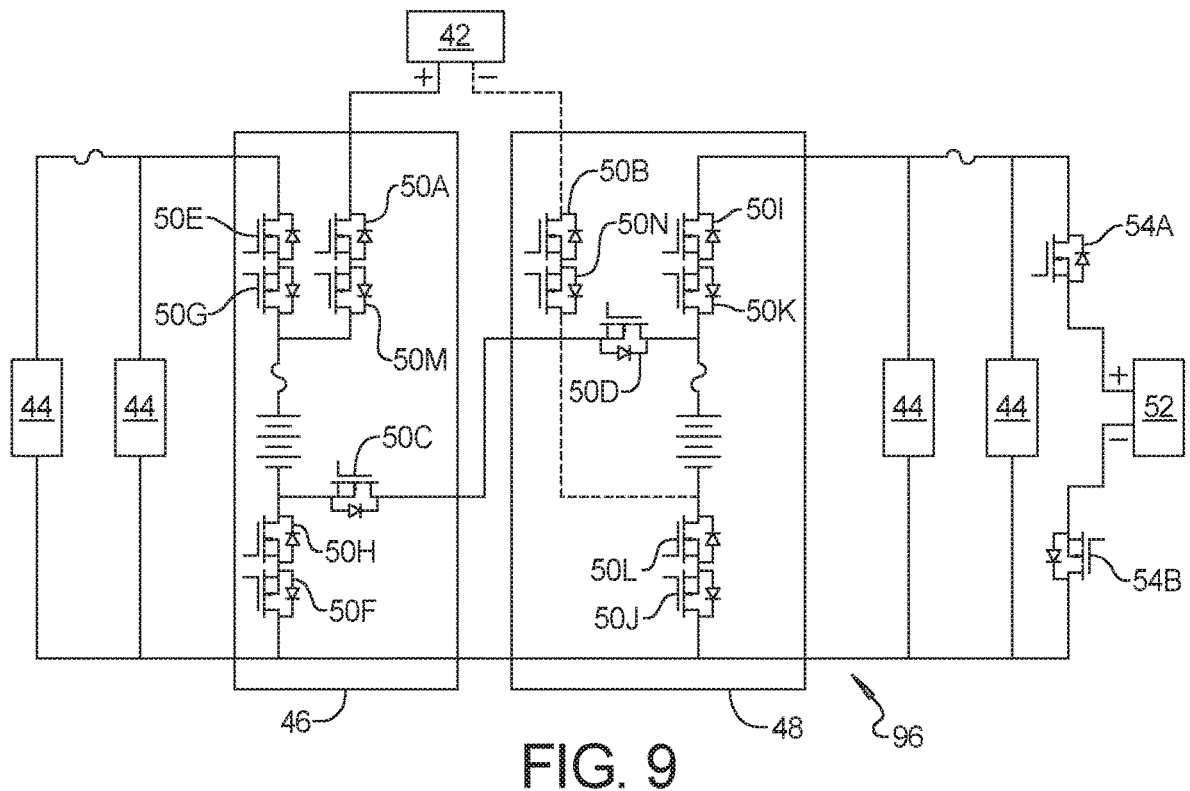
FIG. 9 is a schematic view of a variation of the high voltage electrical propulsion system architecture shown in FIG. 4.

Referring to FIG. 8, another exemplary embodiment of the high voltage electrical propulsion system architecture 94 is a variation of the high voltage electrical propulsion system architecture 40 shown in FIG. 4 and does not include dedicated pre-charge circuits 56, 58. The function of the pre-charge circuits 56, 58 is integrated within the high speed switching capable solid-state switches 50 by ramping the pulse width modulation (PWM) duty cycle of the control signal from 0% to 100% over a pre-determined time interval. Referring to FIG. 9, another exemplary embodiment of the high voltage electrical propulsion system architecture 96 is a variation of the high voltage electrical propulsion system architecture 94 shown in FIG. 8, where two additional switches 50M, 50N are added. Switch 50M is positioned in series with switch 50A to provide bi-directional capability. Switch 50N is positioned in series with switch 50B to provide bi-directional capability. Adding this bi-directional capability makes the high voltage electrical propulsion system architecture "Vehicle2Grid" compatible.

Figures 5, 6:
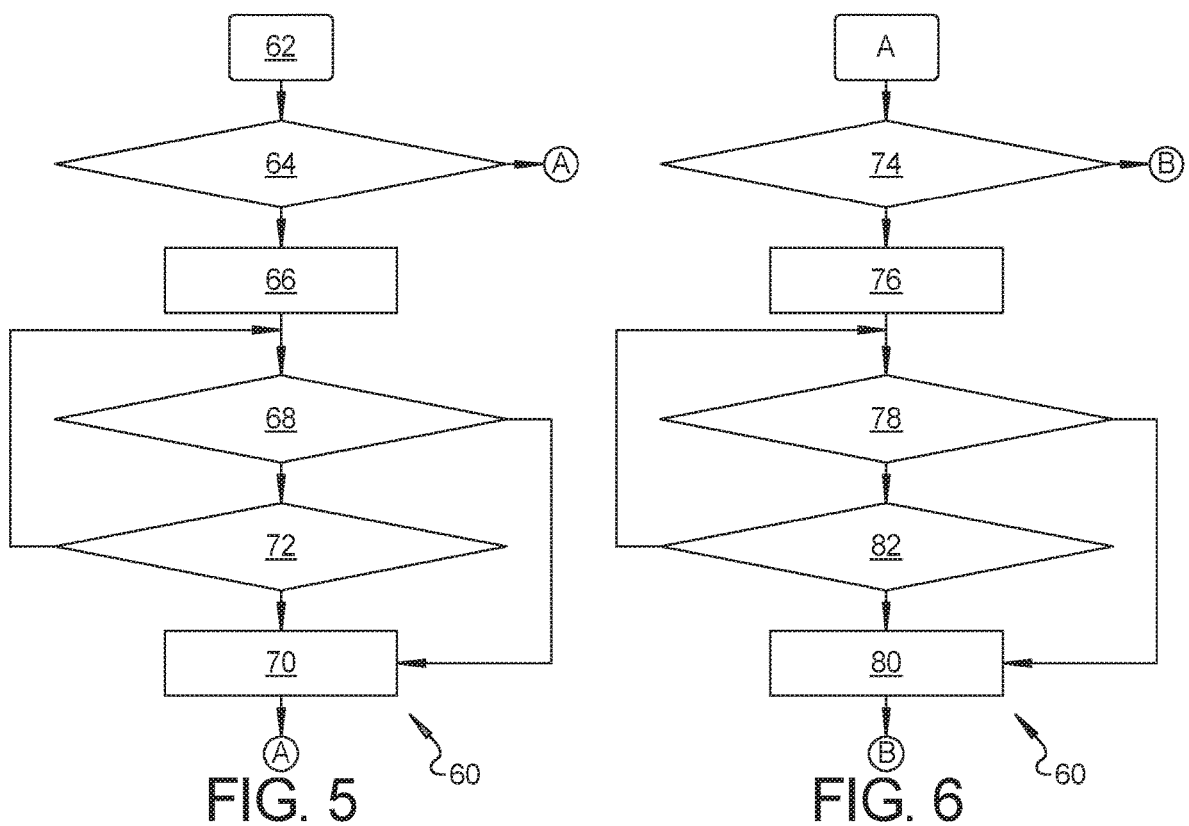
FIG. 5 is a flow-chart illustration of a method of operating the high voltage electrical propulsion system architecture shown in FIG. 4.
FIG. 6 is a continuation of the flow-chart illustration shown in FIG. 5.

Referring to FIG. 5, a method 60 of controlling the high voltage electrical propulsion system 40 shown in FIG. 4 is illustrated. Beginning at block 62 and moving to block 64, the method includes identifying an operating condition of the high voltage electrical propulsion system 10. The operating condition is one of a first charging mode, wherein the first and second battery packs 46, 48 of the high voltage electrical propulsion system 40 are being charged at 800 v, a second charging mode, wherein the first and second battery packs 46, 48 of the high voltage electrical propulsion system 40 are being charged at 400 v, and propulsion mode, wherein power from the first and second battery packs 46, 48 is routed to electrical power components 44 of the high voltage electrical propulsion system 40.

If the high voltage electrical propulsion system 40 is in the first charging mode, moving to block 66, the first plurality of switches 50A, 50B, 50C, 50D are actuated to a closed position, and the second plurality of switches 50E, 50F, 50G, 50H, 50I, 50J, 50K, 50L are actuated to an open position. When the first plurality of switches 50A, 50B, 50C, 50D are closed, the first and second battery packs 46, 48 are connected to the direct current fast charging unit 12 so the first and second battery packs 46, 48 can be charged by the direct current fast charging unit 12 in the first charging mode at 800 v.

Further, when the high voltage electrical propulsion system 40 is in the first charging mode, moving to block 68, if there is a request to the system to terminate charging of the first and second battery packs 46, 48, moving on to block 70, the first and second plurality of switches 50A-50L are actuated to an open state to terminate charging of the first and second battery packs 46, 48 in the first charging mode at 800 v.

If there is no request to terminate charging of the first and second battery packs 46, 48, moving on to block 72, if 800 v charging of the first and second battery packs 46, 48 is complete, moving on to block 70, the first and second plurality of switches 50A-50L are actuated to an open state to terminate charging of the first and second battery packs 46, 48 in the first charging mode at 800 v.

If 800 v charging of the first and second battery packs 46, 48 is not complete, then charging of the first and second battery packs 46, 48 will continue until either there is a request to terminate charging or until the 800 v charging of the first and second battery packs 46, 48 is complete.

Referring to FIG. 6, If the high voltage electrical propulsion system 40 is not in the first charging mode at block 64, or if the first charging mode has been terminated at block 70 in FIG. 5, then, moving to block 74, if the high voltage electrical propulsion system 40 is in the second charging mode, moving to block 76, the third plurality of switches 50A, 50B, 50E, 50F, 50G, 50H, 50I, 50J, 50K, 50L are actuated to a closed position, and the fourth plurality of switches 50C, 50D are actuated to an open position. When the third plurality of switches 50A, 50B, 50E, 50F, 50G, 50H, 50I, 50J, 50K, 50L are closed, the first and second battery packs 46, 48 are connected to the direct current fast charging unit 42 so the first and second battery packs 46, 48 can be charged by the direct current fast charging unit 42 in the second charging mode at 400 v.

Further, when the high voltage electrical propulsion system 40 is in the second charging mode, moving to block 78, if there is a request to the system to terminate charging of the first and second battery packs 46, 48, moving on to block 80, the third and fourth plurality of switches 50A-50L are actuated to an open state to terminate charging of the first and second battery packs 46, 48 in the second charging mode at 400 v.

If there is no request to terminate charging of the first and second battery packs 46, 48, moving on to block 82, if 400 v charging of the first and second battery packs 46, 48 is complete, moving on to block 80, the third and fourth plurality of switches 50A-50L are actuated to an open state to terminate charging of the first and second battery packs 46, 48 in the second charging mode at 400 v.

If 400 v charging of the first and second battery packs 46, 48 is not complete, then charging of the first and second battery packs 46, 48 will continue until either there is a request to terminate charging or until the 400 v charging of the first and second battery packs 46, 48 is complete.

Figure 7:
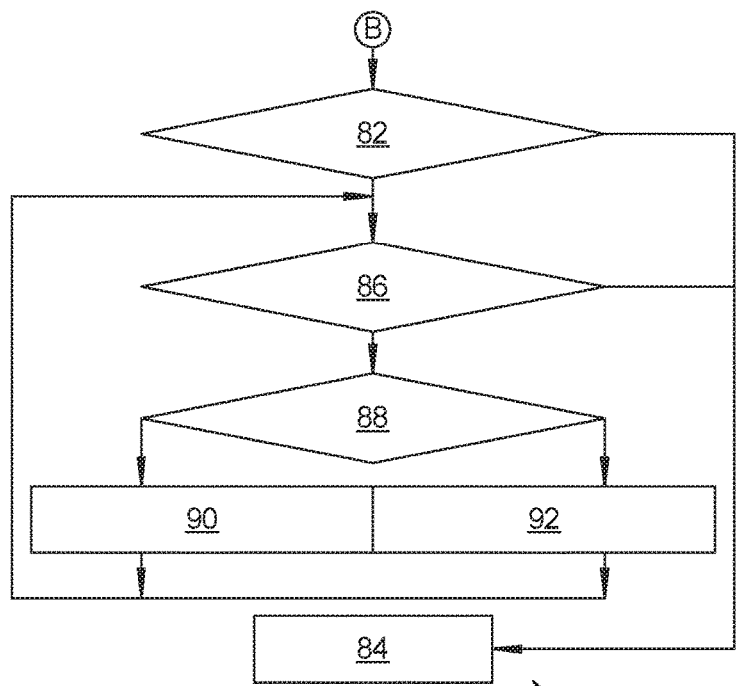
FIG. 7 is a continuation of the flow-chart illustration shown in FIGS. 5 and 6.

Referring to FIG. 7, if the high voltage electrical propulsion system 40 is not in the second charging mode at block 74, or if the second charging mode has been terminated at block 80 in FIG. 6, then, moving to block 82 the system checks to see if the power demand of the vehicle exceeds a pre-determined threshold.

If the power demand of the vehicle exceeds the pre-determined threshold, then moving from block 82 to block 84, the first plurality of switches 50A, 50B, 50C, 50D are actuated to an open position, and the second plurality of switches 50E, 50F, 50G, 50H, 50I, 50J, 50K, 50L are actuated to a closed position to disconnect both the first and second battery packs 46, 48 from the direct current fast charging unit 42 and putting the high voltage electrical propulsion system 40 in propulsion mode.

If the power demand of the vehicle does not exceed the pre-determined threshold, then moving from block 82 to block 86, the state of charge of each of the first and second battery packs 46, 48 are monitored and a delta between the state of charge of the first battery pack and the state of charge of the second battery pack is calculated.

Calculating the state of charge for the first and second battery packs includes obtaining temperature, voltage and current information for cells within the first and second battery packs 46, 48 from sensors within the first and second battery packs 46, 48. Temperature, voltage and current information that is gathered is used by the system to calculate voltage and current within each of the first and second battery packs 46, 48. Comparison of the voltage and current within each of the first and second battery packs 46, 48 is used by the system to estimate a state of charge for each of the first and second battery packs 46, 48.

If the delta between the state of charge of the first battery pack 46 and the state of charge of the second battery pack 48 does not exceed a pre-determined threshold, then moving from block 86 to block 84, the first plurality of switches 50A, 50B, 50C, 50D are actuated to an open position, and the second plurality of switches 50E, 50F, 50G, 50H, 50I, 50J, 50K, 50L are actuated to a closed position to disconnect both the first and second battery packs 46, 48 from the direct current fast charging unit 42 and putting the high voltage electrical propulsion system 40 in propulsion mode. The pre-determined threshold for the delta between the state of charge of the first battery pack 46 and the state of charge of the second battery pack 48 can be up to 10%, or for example, as described herein, can be approximately 1%.

If the delta between the state of charge of the first battery pack 46 and the state of charge of the second battery pack 48 exceeds the pre-determined threshold, then moving from block 86 to block 88, if the state of charge of the first battery pack 46 is greater than the state of charge of the second battery pack 48, moving to block 90, a fifth plurality of switches 50A, 50B, 50C, 50D, 50I, 50J, 50K, 50L, as well as the dedicated pre-charge circuit switches 56B, 58B and the on-board charger module switches 54A, 54B are actuated to an open position, and a sixth plurality of switches 50E, 50F, 50G, 50H are actuated to a closed position to provide power to power components 44 within the electric vehicle from only the first battery pack 46. If the state of charge of the first battery pack 46 is less than the state of charge of the second battery pack 48, moving to block 92, a seventh plurality of switches 50A, 50B, 50C, 50D, 50E, 50F, 50G, 50H, as well as the dedicated pre-charge circuit switches 56B, 58B and the on-board charger module switches 54A, 54B are actuated to an open position, and an eighth plurality of switches 50I, 50J, 50K, 50L are actuated to a closed position to provide power to power components 44 within the electric vehicle from only the second battery pack 48.

The system will continue to operate within either block 90 or block 92, providing power to the power components 44 within the vehicle only from either the first or second battery pack 46, 48, until the delta between the state of charge of the first battery pack 46 and the state of charge of the second battery pack 48 does not exceed the pre-determined threshold.

The high voltage electrical propulsion system architecture 40 is a dual voltage system. As described herein, the high voltage electrical propulsion system 40 operates in either 800 volt mode or 400 volt mode. It should be understood to those skilled in the art that the principles of the present disclosure would work equally well with any dual voltage arrangement wherein the system includes dual battery packs having equal voltages.

Figure 10:
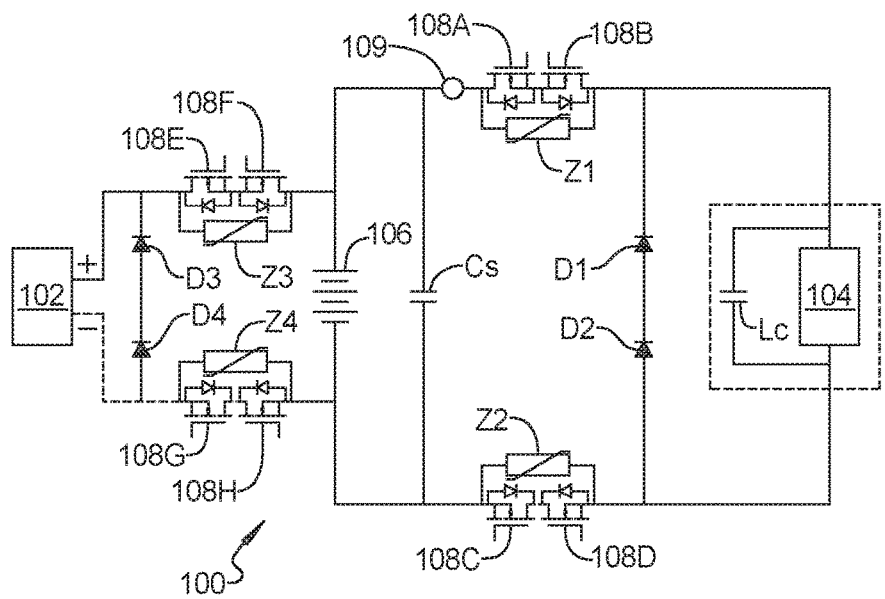
FIG. 10 is a schematic view of a high voltage electrical propulsion system architecture according to another exemplary embodiment of the present disclosure.

Referring to FIG. 10, an exemplary embodiment of a high voltage electrical propulsion system architecture 100 is shown that does not include a dedicated pre-charge circuit. The high voltage electrical propulsion system architecture 100 includes a direct current fast charging unit 102, a plurality of power components 104, a battery pack 106, a plurality of switches 108 adapted to selectively connect the battery pack 106 to one of the direct current fast charging unit 102 and the power components 104 within the automotive vehicle.

Power components 104 within the automotive vehicle are those typically found in automobiles, and particularly in electrified automobiles, such as, but not limited to, traction power inverter module (TPIM), air-conditioning compressor module (ACCM), accessory power module (ACM), and other integrated power electronics (IPE).

The function of a pre-charge circuit is integrated within the high speed switching capable solid state switches by ramping pulse-width modulation (PWM) duty cycle of the control signal (@10 kHz to 20 kHz) from 0 to 100% over a predetermined duration (<0.2 sec) to limit the inrush current. The circuit comprising diodes D1, D2, capacitor Cs and transient voltage suppressor diodes Z1, Z2 are used to limit transient voltages across switches 108A-108D due to source and load side inductances during switch-off. A single diode is sufficient in place of D1 and D2 pair or D3 and D4 pair for freewheeling current path but two have been shown here with redundancy in mind.

It is possible to eliminate the need for a pre-charge circuit (switch PC and a resistor) and instead use the main switches 108A, 108B or 108C, 108D in PWM mode to pre-charge the load capacitance. During pre-charge, with switches 108C and 108D closed, current flows from the battery pack 106 to the power components 104 via 108A and 108B, and charges the load capacitor Lc with limited inrush current due to PWM duty cycle control. During PWM off condition or interruption of current, when switches 108A and 108B are both open, the diodes D1 and D2 and capacitor Cs will provide a freewheeling path for the cable inductances on load and battery side respectively. During REGEN mode, current flows from power components 104 to the battery pack 106, via switches 108A, 108B, 108C, 108D in reverse direction. During the off-state when switches 108A, 108B, 108C, 108D are open, current will flow through transient voltage suppressors Z1 and Z2 which will allow for the absorption of the reactive energy (in the battery and load cable inductances) and damping. Similar function is provided for the direct current fast charge side via switches 108E, 108F, 108G, 108H, diodes D3 and D4, transient voltage suppressors Z3 and Z4, and capacitor Cs. Additionally, a current sensor 109 is positioned in functional engagement with the solid-state switch 108A. With smart controls, the current sensor 109 and the solid-state switch 108A function as a programmable fuse to precisely limit the fault current in the circuit and protect the circuit for improved safety in case of overcurrent fault. The current sensor 109 and solid-state switch 108A can be scaled or tuned to customize the fault current for specific applications.

Figure 11:
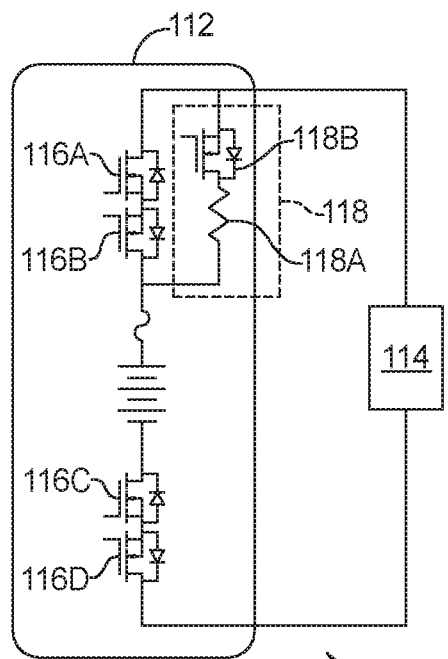
FIG. 11 is a schematic view of a high voltage electrical propulsion system architecture according to another exemplary embodiment of the present disclosure.

Referring to FIG. 11, another exemplary embodiment of an high voltage electrical propulsion system architecture 110 is shown. The high voltage electrical propulsion system architecture 110 includes a battery pack 112, a plurality of power components 114, and a plurality of switches 116A, 116B, 116C, 116D adapted to selectively connect the battery pack 112 to the power components 114 within the automotive vehicle.

Power components 114 within the automotive vehicle are those typically found in automobiles, and particularly in electrified automobiles, such as, but not limited to, traction power inverter module (TPIM), air-conditioning compressor module (ACCM), accessory power module (ACM), and other integrated power electronics (IPE).

As shown in FIG. 11, the high voltage electrical propulsion system architecture 110 includes a dedicated pre-charge circuit 118 for the battery pack 112. The dedicated precharge circuit 118 includes a pre-charge resistor 118A and a pre-charge switch 118B which could be unidirectional or bidirectional. When the battery pack 112 is initially connected to a load with capacitive input, there is an inrush current flowing in the circuit as the load capacitor gets charged to the battery voltage. This inrush current can be very high and may damage the switch and the load capacitor. The pre-charge circuit 118 limits the inrush current within the battery pack 112 to prevent damage to components.

Figure 12:
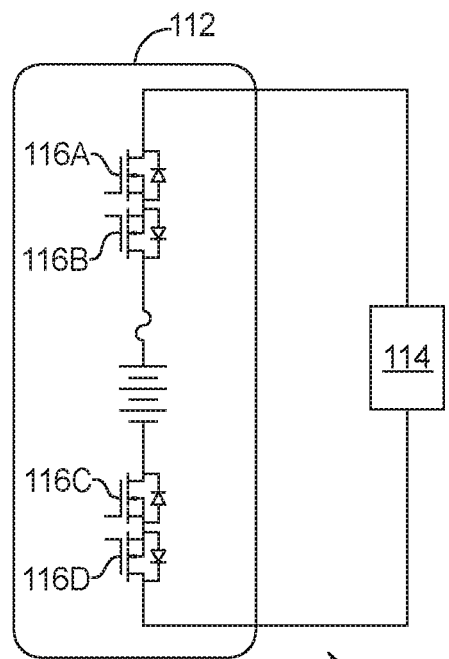
FIG. 12 is a schematic view of a variation of the high voltage electrical propulsion system architecture shown in FIG. 11, wherein the high voltage electrical propulsion system architecture does not have a dedicated pre-charge circuit.

Referring to FIG. 12, another exemplary embodiment of the high voltage electrical propulsion system architecture 111 is a variation of the high voltage electrical propulsion system architecture 110 shown in FIG. 11 and does not include a dedicated pre-charge circuit 118. The function of the pre-charge circuit is integrated within the high speed switching capable solid-state switches 116A, 116B, 116C, 116D by ramping the pulse width modulation (PWM) duty cycle of the control signal from 0% to 100% over a pre-determined time interval.

Figure 13A:
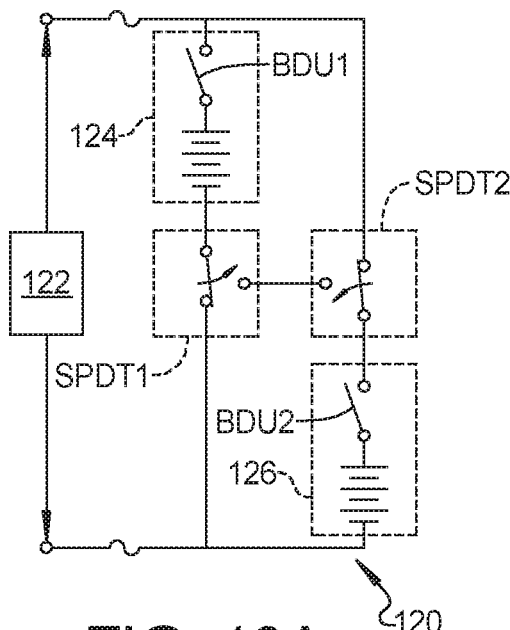
FIG. 13A is a schematic view of a high voltage electrical propulsion system architecture according to another exemplary embodiment of the present disclosure.

Referring to FIG. 13A, an exemplary embodiment of a high voltage electrical propulsion system architecture 120 is shown that includes a direct current fast charging unit 122, a first battery pack 124, a second battery pack 126, a first battery disconnect BDU1 adapted to isolate the first battery pack 124, a second battery disconnect BDU2 adapted to isolate the second battery pack 126, and first and second single pole double throw switches SPDT1, SPDT2 adapted to selectively interconnect the first and second battery packs 124, 126 and the direct current fast charging unit 122.

Figure 14:
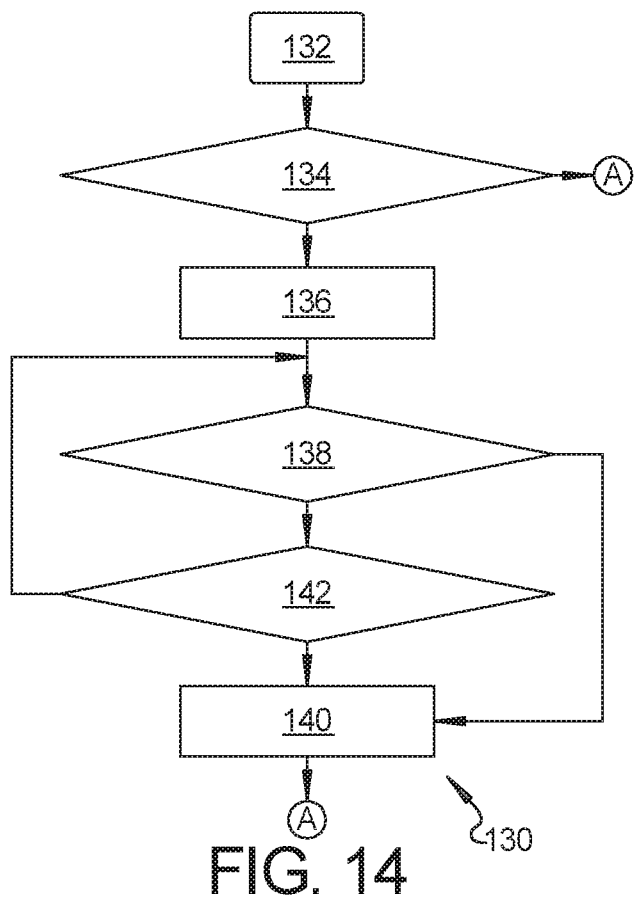
FIG. 14 is a flow-chart illustration of a method of operating the high voltage electrical propulsion system architecture shown in FIGS. 13A-13D.

Referring to FIG. 14, a method 130 of controlling the high voltage electrical propulsion system 120 shown in FIG. 14 is illustrated. Beginning at block 132 and moving to block 134, the method includes identifying an operating condition of the high voltage electrical propulsion system 120. The operating condition is one of charging mode, wherein the first and second battery packs 124, 126 of the high voltage electrical propulsion system 120 are being charged at 800 v, and propulsion mode.

Figure 13B:
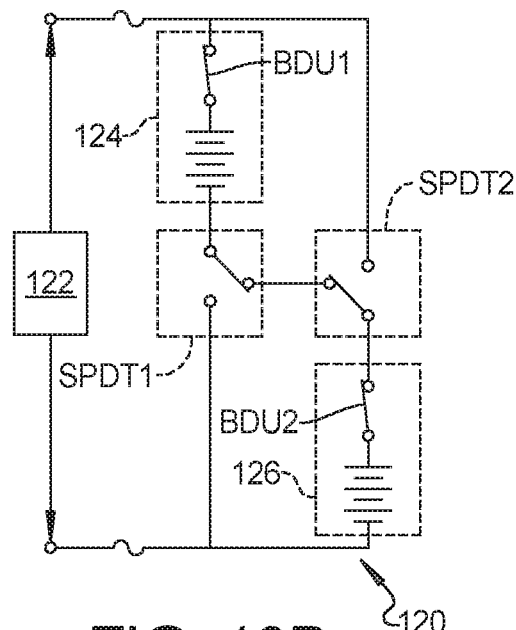
FIG. 13B is a schematic view of the high voltage electrical propulsion system architecture, wherein the high voltage electrical propulsion system architecture is configured for 800 v charging.

If the high voltage electrical propulsion system 120 is in the charging mode, moving to block 136, the first and second battery disconnects BDU1, BDU2 are actuated to a closed position, and the first and second single pole double throw switches SPDT1, SPDT2 are actuated to normally open positions, as indicated in FIG. 13B. When the first and second battery disconnects BDU1, BDU2 are actuated to a closed position, and the first and second single pole double throw switches SPDT1, SPDT2 are actuated to normally open positions, the first and second battery packs 124, 126 are connected in series to the direct current fast charging unit 122 so the first and second battery packs 124, 126 can be charged by the direct current fast charging unit 122 at 800 v.

Further, when the high voltage electrical propulsion system 120 is in the charging mode, moving to block 138, if there is a request to the system to terminate charging of the first and second battery packs 124, 126, moving on to block 140, the first and second battery disconnects BDU1, BDU2 are actuated to an open state to terminate charging of the first and second battery packs 124, 126.

If there is no request to terminate charging of the first and second battery packs 124, 126, moving on to block 142, if charging of the first and second battery packs 124, 126 is complete, moving on to block 140, the first and second battery disconnects BDU1, BDU2 are actuated to an open state to terminate charging of the first and second battery packs 124, 126.

If charging of the first and second battery packs 124, 126 is not complete, then charging of the first and second battery packs 124, 126 will continue until either there is a request to terminate charging or until the charging of the first and second battery packs 124, 126 is complete.

Figure 15:
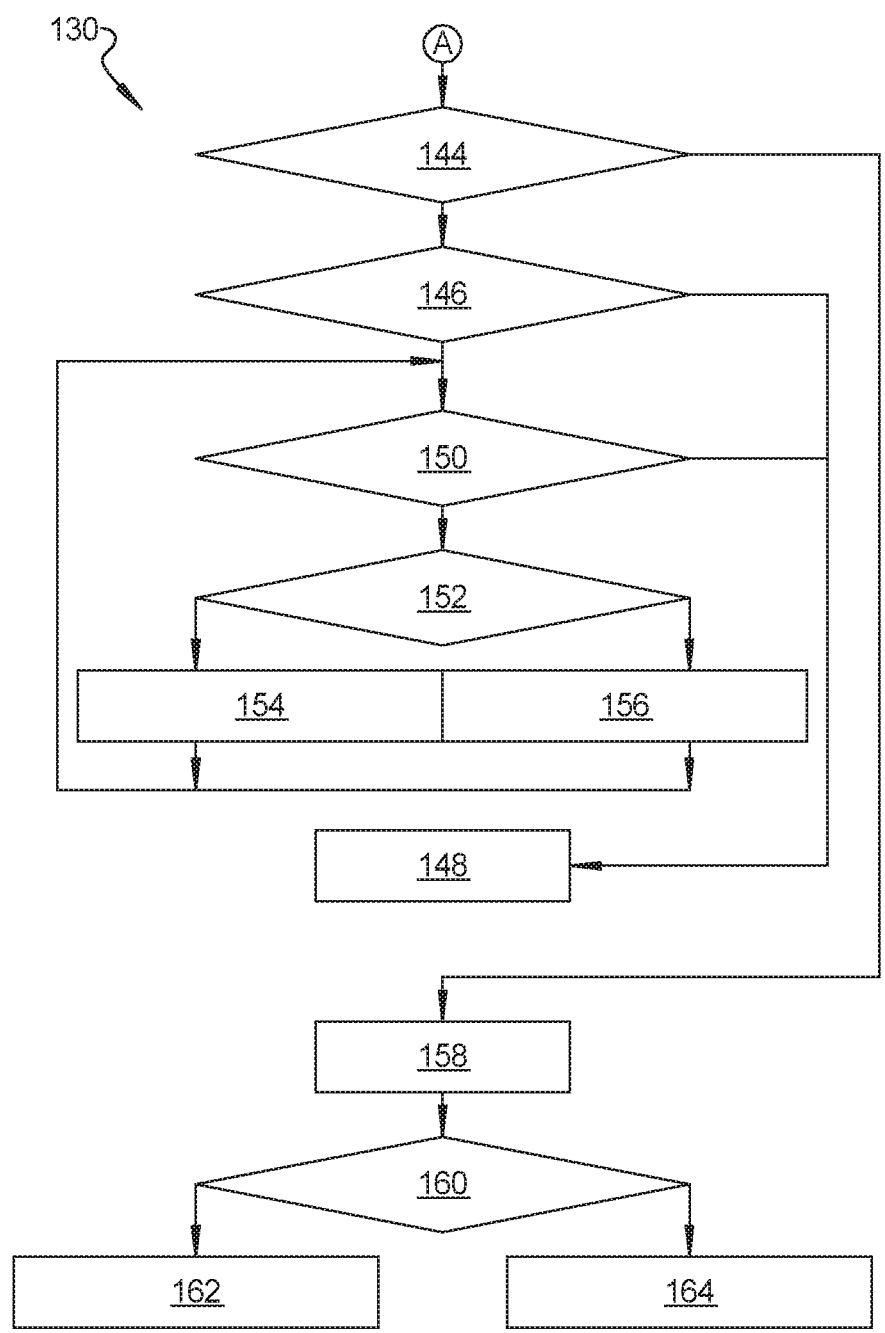
FIG. 15 is a continuation of the flow-chart illustration shown in FIG. 14.

Referring to FIG. 15, if the high voltage electrical propulsion system 120 is not in the charging mode at block 134, or if the charging mode has been terminated at block 140 in FIG. 14, then, moving to block 144, the system checks to see if both of the first and second battery packs 124, 126 are healthy. This is done using know battery evaluation techniques typically used on electric vehicles to evaluate the health of battery packs.

If both of the first and second battery packs 124, 126 are healthy, moving from block 144 to block 146, the system checks to see if the power demand of the vehicle exceeds a pre-determined threshold.

Figure 13C:
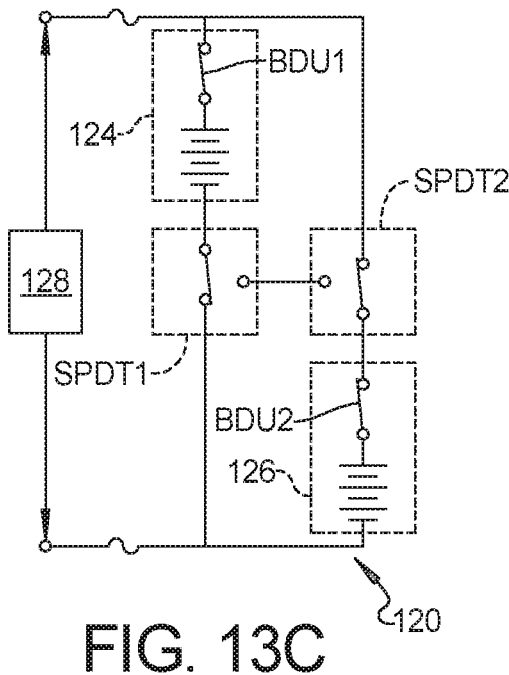
FIG. 13C is a schematic view of the high voltage electrical propulsion system architecture, wherein the high voltage electrical propulsion system architecture is configured for 400 v normal operation.

If the power demand of the vehicle exceeds the pre-determined threshold, then moving from block 146 to block 148, the first and second battery disconnects BDU1, BDU2 are actuated to a closed position, and both of the single pole double throw switches SPDT1, SPDT2 are actuated to a normally closed position, as shown in FIG. 13C. When the first and second battery disconnects BDU1, BDU2 are actuated to a closed position, and both of the single pole double throw switches SPDT1, SPDT2 are actuated to a normally closed position, the high voltage electrical propulsion system 120 operates in propulsion mode, providing 400 v power to the vehicle.

If the power demand of the vehicle does not exceed the pre-determined threshold, then moving from block 146 to block 150, the state of charge of each of the first and second battery packs 124, 126 are monitored and a delta between the state of charge of the first battery pack 124 and the state of charge of the second battery pack 126 is calculated.

If the delta between the state of charge of the first battery pack 124 and the state of charge of the second battery pack 126 does not exceed a pre-determined threshold, then moving from block 150 to block 148, the first and second battery disconnects BDU1, BDU2 are actuated to a closed position, and both of the single pole double throw switches SPDT1, SPDT2 are actuated to a normally closed position, as shown in FIG. 13C. When the first and second battery disconnects BDU1, BDU2 are actuated to a closed position, and both of the single pole double throw switches SPDT1, SPDT2 are actuated to a normally closed position, the high voltage electrical propulsion system 120 operates in propulsion mode, providing 400 v power to power components 128 the vehicle. The pre-determined threshold for the delta between the state of charge of the first battery pack 124 and the state of charge of the second battery pack 126 is approximately 1%.

Figure 13D:
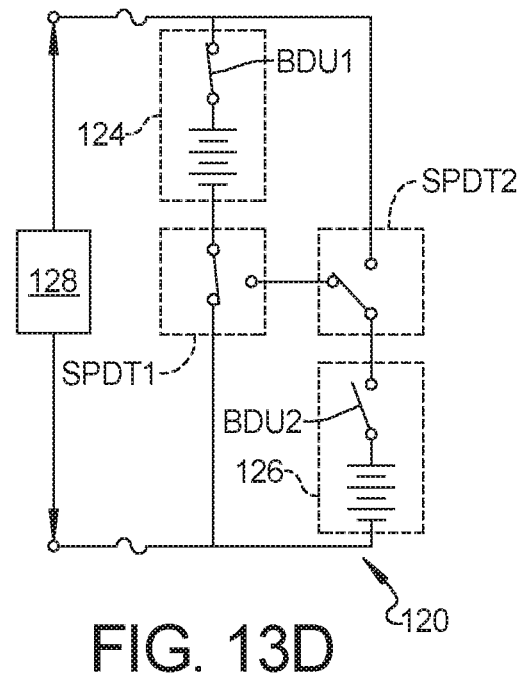
FIG. 13D is a schematic view of the high voltage electrical propulsion system architecture, wherein a faulty battery pack is isolated from the system.

If the delta between the state of charge of the first battery pack 124 and the state of charge of the second battery pack 126 exceeds the pre-determined threshold, then moving from block 150 to block 152, if the state of charge of the first battery pack 124 is greater than the state of charge of the second battery pack 126, moving to block 154, the first battery disconnect BDU1 is actuated to a closed position, the second battery disconnect BDU2 is actuated to an open position, the first single pole double throw switch SPDT1 is actuated to a normally closed position, and the second single pole double throw switch SPDT2 is actuated to a normally open position, as shown in FIG. 13D. When the first battery disconnect BDU1 is actuated to a closed position, the second battery disconnect BDU2 is actuated to an open position, the first single pole double throw switch SPDT1 is actuated to a normally closed position, and the second single pole double throw switch SPDT2 is actuated to a normally open position, the second battery pack 126 is isolated and power is provided to the electric vehicle only from the first battery pack 124.

If the state of charge of the first battery pack 124 is less than the state of charge of the second battery pack 126, moving to block 156, the first battery disconnect BDU1 is actuated to an open position, the second battery disconnect BDU2 is actuated to a closed position, the first single pole double throw switch SPDT1 is actuated to a normally open position, and the second single pole double throw switch SPDT2 is actuated to a normally closed position. When the first battery disconnect BDU1 is actuated to an open position, the second battery disconnect BDU2 is actuated to a closed position, the first single pole double throw switch SPDT1 is actuated to a normally open position, and the second single pole double throw switch SPDT2 is actuated to a normally closed position, the first battery pack 124 is isolated and power is provided to the electric vehicle only from the second battery pack 126. The system will continue to operate within either block 154 or block 156, providing power only from either the first or second battery pack 124, 126, until the delta between the state of charge of the first battery pack 124 and the state of charge of the second battery pack 126 does not exceed the pre-determined threshold.

If at block 144, the system determines that both of the first and second battery packs 124, 126 are not healthy, moving from block 144 to block 158, the system sets a diagnostic code. Moving on to block 160, the system will evaluate the first battery pack 124. If the first battery pack 124 is healthy, then, moving to block 162, the first battery disconnect BDU1 is actuated to a closed position, the second battery disconnect BDU2 is actuated to an open position, the first single pole double throw switch SPDT1 is actuated to a normally closed position, and the second single pole double throw switch SPDT2 is actuated to a normally open position, as shown in FIG. 13D. When the first battery disconnect BDU1 is actuated to a closed position, the second battery disconnect BDU2 is actuated to an open position, the first single pole double throw switch SPDT1 is actuated to a normally closed position, and the second single pole double throw switch SPDT2 is actuated to a normally open position, the faulty second battery pack 126 is isolated and power is provided to the electric vehicle only from the first battery pack 124.

If the first battery pack 124 is not healthy, moving to block 164, the first battery disconnect BDU1 is actuated to an open position, the second battery disconnect BDU2 is actuated to a closed position, the first single pole double throw switch SPDT1 is actuated to a normally open position, and the second single pole double throw switch SPDT2 is actuated to a normally closed position. When the first battery disconnect BDU1 is actuated to an open position, the second battery disconnect BDU2 is actuated to a closed position, the first single pole double throw switch SPDT1 is actuated to a normally open position, and the second single pole double throw switch SPDT2 is actuated to a normally closed position, the faulty first battery pack 124 is isolated and power is provided to the electric vehicle only from the second battery pack 126.

Figure 16:
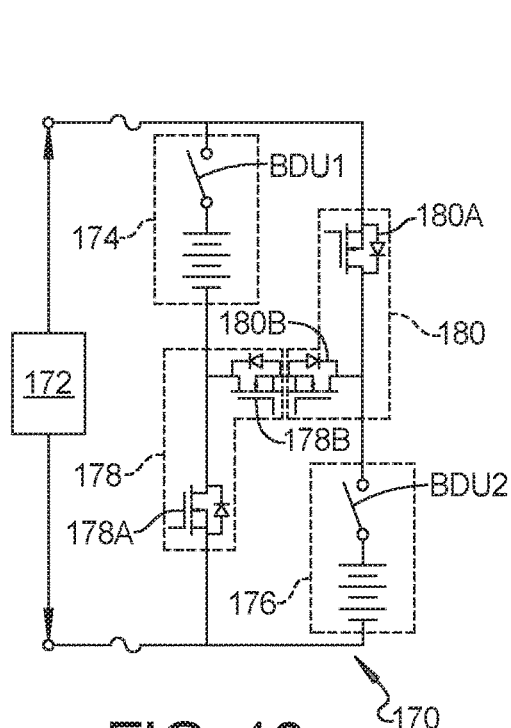
FIG. 16 is a schematic view of a high voltage electrical propulsion system architecture according to another exemplary embodiment of the present disclosure.

Referring to FIG. 16, an exemplary embodiment of a high voltage electrical propulsion system architecture 170 is shown. The high voltage electrical propulsion system architecture 170 is a variation of the high voltage electrical propulsion system architecture 120, shown in FIG. 13A. The high voltage electrical propulsion system architecture 170 includes a direct current fast charging unit 172, a first battery pack 174, a second battery pack 176, a first battery disconnect BDU1 adapted to isolate the first battery pack 174, a second battery disconnect BDU2 adapted to isolate the second battery pack 176, and first and second half-bridge power modules 178, 180. The first half-bridge power module 178 includes a pair of solid-state switches 178A, 178B, and the second half-bridge power module 180 includes a pair of solid-state switches 180A, 180B. The first and second battery disconnects BDU1, BDU2 and the first and second half-bridge power modules 178, 180 adapted to selectively interconnect the first and second battery packs 174, 176 and the direct current fast charging unit 172.

Figure 17:
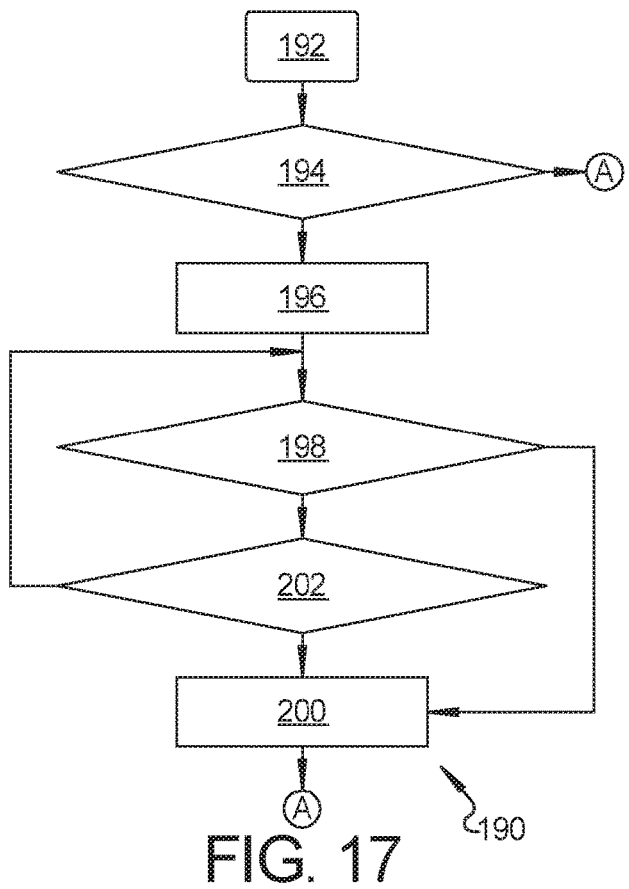
FIG. 17 is a flow-chart illustration of a method of operating the high voltage electrical propulsion system architecture shown in FIG. 16.

Referring to FIG. 17, a method 190 of controlling the high voltage electrical propulsion system 170 shown in FIG. 16 is illustrated. Beginning at block 192 and moving to block 194, the method includes identifying an operating condition of the high voltage electrical propulsion system 170. The operating condition is one of charging mode, wherein the first and second battery packs 174, 176 of the high voltage electrical propulsion system 170 are being charged at 800 v, and propulsion mode.

If the high voltage electrical propulsion system 170 is in the charging mode, moving to block 196, the first and second battery disconnects BDU1, BDU2 are actuated to a closed position, switches 178B and 180B are actuated to a closed position, and switches 178A and 180A are actuated to an open position. When first and second battery disconnects BDU1, BDU2 are actuated to a closed position, switches 178B and 180B are actuated to a closed position, and switches 178A and 180A are actuated to an open position, the first and second battery packs 174, 176 are connected in series to the direct current fast charging unit 172 so the first and second battery packs 174, 176 can be charged by the direct current fast charging unit 172 at 800 v.

Further, when the high voltage electrical propulsion system 170 is in the charging mode, moving to block 198, if there is a request to the system to terminate charging of the first and second battery packs 174, 176, moving on to block 200, the first and second battery disconnects BDU1, BDU2 and switches 178A, 178B, 180A, 180B are actuated to an open state to terminate charging of the first and second battery packs 174, 176.

If there is no request to terminate charging of the first and second battery packs 174, 176, moving on to block 202, if charging of the first and second battery packs 174, 176 is complete, moving on to block 200, the first and second battery disconnects BDU1, BDU2 and switches 178A, 178B, 180A, 180B are actuated to an open state to terminate charging of the first and second battery packs 174, 176.

If charging of the first and second battery packs 174, 176 is not complete, then charging of the first and second battery packs 174, 176 will continue until either there is a request to terminate charging or until the charging of the first and second battery packs 174, 176 is complete.

Figure 18:
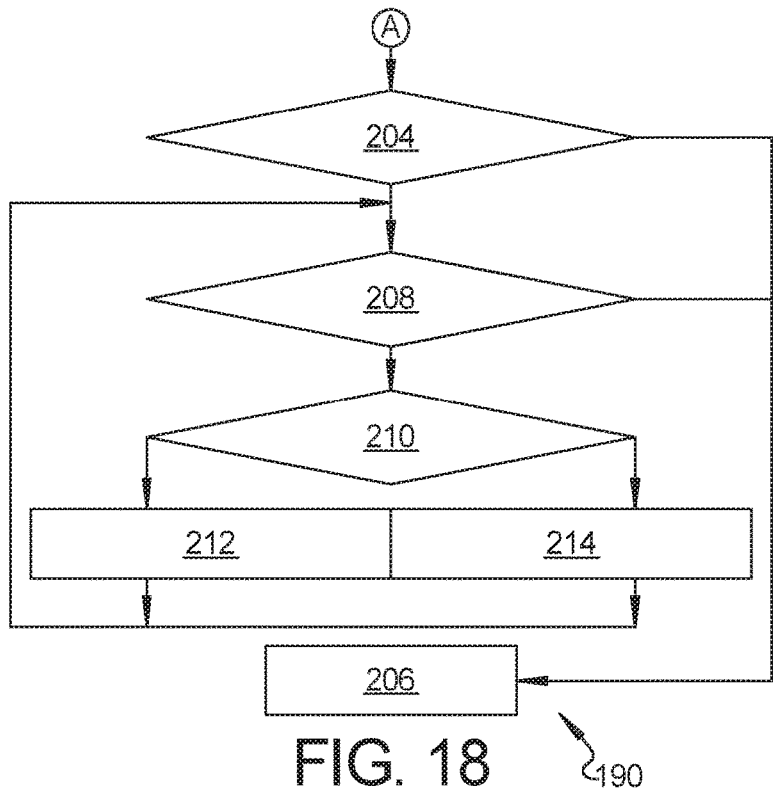
FIG. 18 is a continuation of the flow-chart illustration shown in FIG. 17.

Referring to FIG. 18, if the high voltage electrical propulsion system 170 is not in the charging mode at block 194, or if the charging mode has been terminated at block 200 in FIG. 17, then, moving to block 204, the system checks to see if the power demand of the vehicle exceeds a pre-determined threshold.

If the power demand of the vehicle exceeds the pre-determined threshold, then moving from block 204 to block 206, the first and second battery disconnects BDU1, BDU2 are actuated to a closed position, switches 178A and 180A are actuated to a closed position, and switches 178B and 180B are actuated to an open position. When the first and second battery disconnects BDU1, BDU2 are actuated to a closed position, switches 178A and 180A are actuated to a closed position, and switches 178B and 180B are actuated to an open position, the high voltage electrical propulsion system 170 operates in propulsion mode, providing 400 v power to the vehicle.

If the power demand of the vehicle does not exceed the pre-determined threshold, then moving from block 204 to block 208, the state of charge of each of the first and second battery packs 174, 176 are monitored and a delta between the state of charge of the first battery pack 174 and the state of charge of the second battery pack 176 is calculated.

If the delta between the state of charge of the first battery pack 174 and the state of charge of the second battery pack 176 does not exceed a pre-determined threshold, then moving from block 208 to block 206, the first and second battery disconnects BDU1, BDU2 are actuated to a closed position, switches 178A and 180A are actuated to a closed position, and switches 178B and 180B are actuated to an open position. When the first and second battery disconnects BDU1, BDU2 are actuated to a closed position, switches 178A and 180A are actuated to a closed position, and switches 178B and 180B are actuated to an open position, the high voltage electrical propulsion system 170 operates in propulsion mode, providing 400 v power to the vehicle. The pre-determined threshold for the delta between the state of charge of the first battery pack 174 and the state of charge of the second battery pack 176 is approximately 1%.

If the delta between the state of charge of the first battery pack 174 and the state of charge of the second battery pack 176 exceeds the pre-determined threshold, then moving from block 208 to block 210, if the state of charge of the first battery pack 174 is greater than the state of charge of the second battery pack 176, moving to block 212, the first battery disconnect BDU1 and switch 178A is actuated to a closed position, and the second battery disconnect BDU2 and switches 178B, 180A, 180B are actuated to an open position. When first battery disconnect BDU1 and switch 178A is actuated to a closed position, and the second battery disconnect BDU2 and switches 178B, 180A, 180B are actuated to an open position, the second battery pack 176 is isolated and power is provided to the electric vehicle only from the first battery pack 174.

If the state of charge of the first battery pack 174 is less than the state of charge of the second battery pack 176, moving to block 214, the first battery disconnect BDU1 and switches 178A, 178B, 180B are actuated to an open position, and the second battery disconnect BDU2 and switch 180A are actuated to a closed position. When the first battery disconnect BDU1 and switches 178A, 178B, 180B are actuated to an open position, and the second battery disconnect BDU2 and switch 180A are actuated to a closed position, the first battery pack 174 is isolated and power is provided to the electric vehicle only from the second battery pack 176. The system will continue to operate within either block 212 or block 214, providing power only from either the first or second battery pack 174, 176, until the delta between the state of charge of the first battery pack 174 and the state of charge of the second battery pack 176 does not exceed the pre-determined threshold.

Figure 19:
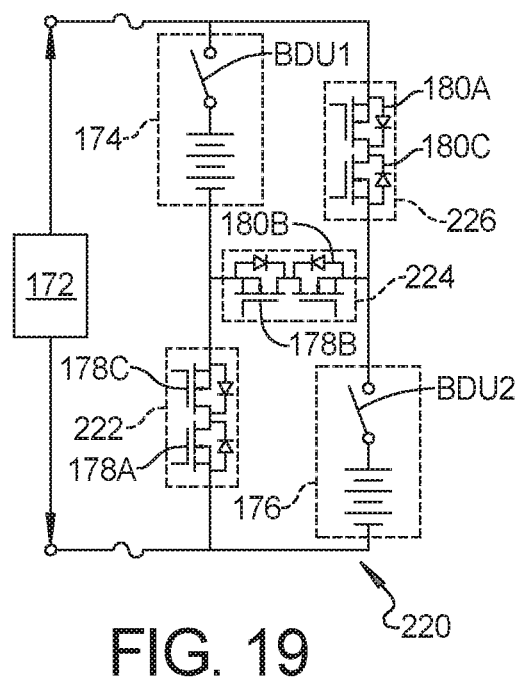
FIG. 19 is a schematic view of a high voltage electrical propulsion system architecture according to another exemplary embodiment of the present disclosure.

Referring to FIG. 19, an exemplary embodiment of a high voltage electrical propulsion system architecture 220 is shown. The high voltage electrical propulsion system architecture 220 is a variation of the high voltage electrical propulsion system architecture 170, shown in FIG. 16, wherein two additional switches 180C, 178C have been added. Switches 178A and 178C define a first half-bridge power module 222, switches 178B and 180B define a second half-bridge power module 224, and switches 180A and 180C define a third half-bridge power module 226. The addition of switches 178C and 180C provides added flexibility in isolating either of the first and second battery packs 174, 176 from the high voltage electrical propulsion system 220 when there is an internal fault within one of the first and second battery packs 174, 176. New switches 178C, 180C also provide flexibility in discharging either of the first and second battery packs 174, 176 to provide power to the high voltage electrical propulsion system 220.

Figure 20:
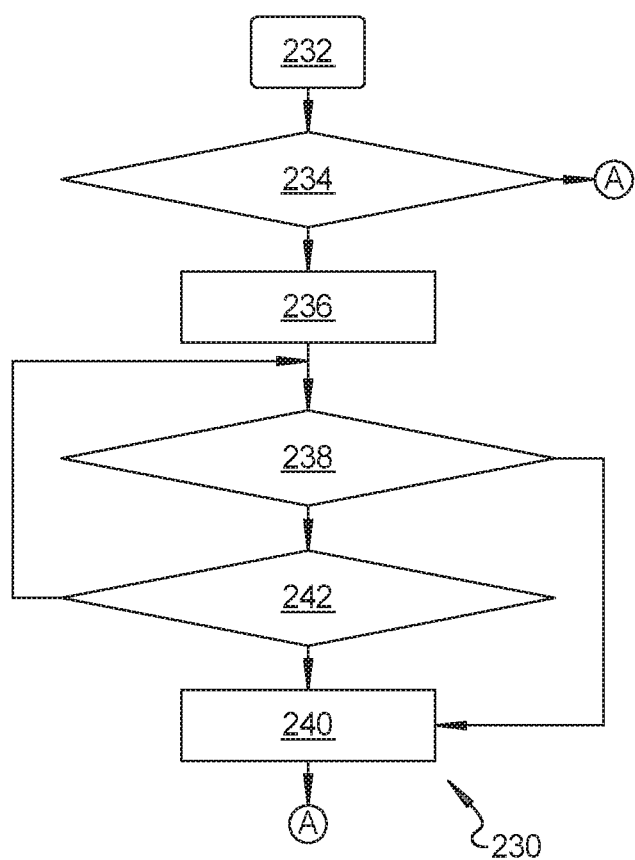
FIG. 20 is a flow-chart illustration of a method of operating the high voltage electrical propulsion system architecture shown in FIG. 19.

Referring to FIG. 20, a method 230 of controlling the high voltage electrical propulsion system 220 shown in FIG. 19 is illustrated. Beginning at block 232 and moving to block 234, the method includes identifying an operating condition of the high voltage electrical propulsion system 220. The operating condition is one of charging mode, wherein the first and second battery packs 174, 176 of the high voltage electrical propulsion system 220 are being charged at 800 v, and propulsion mode.

If the high voltage electrical propulsion system 220 is in the charging mode, moving to block 236, the first and second battery disconnects BDU1, BDU2 are actuated to a closed position, switches 178B and 180B are actuated to a closed position, and switches 178A, 178C, 180A and 180C are actuated to an open position. When first and second battery disconnects BDU1, BDU2 are actuated to a closed position, switches 178B and 180B are actuated to a closed position, and switches 178A, 178C, 180A and 180C are actuated to an open position, the first and second battery packs 174, 176 are connected in series to the direct current fast charging unit 172 so the first and second battery packs 174, 176 can be charged by the direct current fast charging unit 172 at 800 v.

Further, when the high voltage electrical propulsion system 220 is in the charging mode, moving to block 238, if there is a request to the system to terminate charging of the first and second battery packs 174, 176, moving on to block 240, the first and second battery disconnects BDU1, BDU2 and switches 178A, 178B, 178C, 180A, 180B, 180C are actuated to an open state to terminate charging of the first and second battery packs 174, 176.

If there is no request to terminate charging of the first and second battery packs 174, 176, moving on to block 242, if charging of the first and second battery packs 174, 176 is complete, moving on to block 240, the first and second battery disconnects BDU1, BDU2 and switches 178A, 178B, 178C, 180A, 180B, 180C are actuated to an open state to terminate charging of the first and second battery packs 174, 176.

If charging of the first and second battery packs 174, 176 is not complete, then charging of the first and second battery packs 174, 176 will continue until either there is a request to terminate charging or until the charging of the first and second battery packs 174, 176 is complete.

Figure 21:
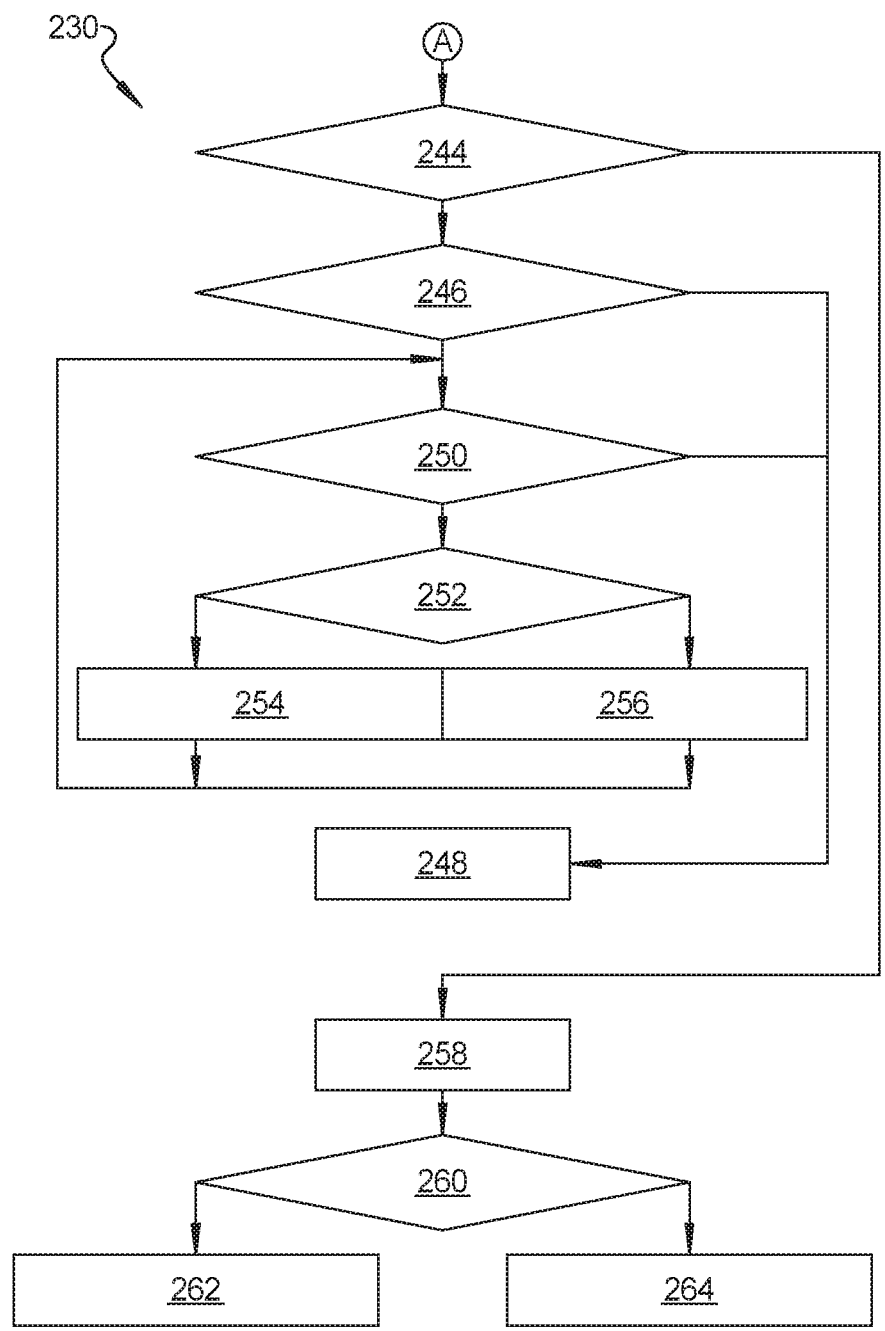
FIG. 21 is a continuation of the flow-chart illustration shown in FIG. 20.

Referring to FIG. 21, if the high voltage electrical propulsion system 220 is not in the charging mode at block 234, or if the charging mode has been terminated at block 240 in FIG. 20, then, moving to block 244, the system checks if both of the first and second battery packs 174, 176 are healthy. This is done using known battery evaluation techniques typically used on electric vehicles to evaluate the health of battery packs.

If both of the first and second battery packs 174, 176 are healthy, moving from block 244 to block 246, the system checks to see if the power demand of the vehicle exceeds a pre-determined threshold.

If the power demand of the vehicle exceeds the pre-determined threshold, then moving from block 246 to block 248, the first and second battery disconnects BDU1, BDU2 are actuated to a closed position, switches 178A, 178C, 180A and 180C are actuated to a closed position, and switches 178B and 180B are actuated to an open position. When the first and second battery disconnects BDU1, BDU2 are actuated to a closed position, switches 178A, 178C, 180A and 180C are actuated to a closed position, and switches 178B and 180B are actuated to an open position, the high voltage electrical propulsion system 220 operates in propulsion mode, providing 400 v power to the vehicle.

If the power demand of the vehicle does not exceed the pre-determined threshold, then moving from block 246 to block 250, the state of charge of each of the first and second battery packs 174, 176 are monitored and a delta between the state of charge of the first battery pack 174 and the state of charge of the second battery pack 176 is calculated.

If the delta between the state of charge of the first battery pack 174 and the state of charge of the second battery pack 176 does not exceed a pre-determined threshold, then moving from block 250 to block 248, the first and second battery disconnects BDU1, BDU2 are actuated to a closed position, switches 178A, 178C, 180A and 180C are actuated to a closed position, and switches 178B and 180B are actuated to an open position. When the first and second battery disconnects BDU1, BDU2 are actuated to a closed position, switches 178A, 178C, 180A and 180C are actuated to a closed position, and switches 178B and 180B are actuated to an open position, the high voltage electrical propulsion system 220 operates in propulsion mode, providing 400 v power to the vehicle. The pre-determined threshold for the delta between the state of charge of the first battery pack 174 and the state of charge of the second battery pack 176 is approximately 1%.

If the delta between the state of charge of the first battery pack 174 and the state of charge of the second battery pack 176 exceeds the pre-determined threshold, then moving from block 250 to block 252, if the state of charge of the first battery pack 174 is greater than the state of charge of the second battery pack 176, moving to block 254, the first battery disconnect BDU1 and switches 178A, 178C are actuated to a closed position, and the second battery disconnect BDU2 and switches 178B, 180A, 180B, 180C are actuated to an open position. When first battery disconnect BDU1 and switches 178A, 178C are actuated to a closed position, and the second battery disconnect BDU2 and switches 178B, 180A, 180B, 180C are actuated to an open position, the second battery pack 176 is isolated and power is provided to the electric vehicle only from the first battery pack 174.

If the state of charge of the first battery pack 174 is less than the state of charge of the second battery pack 176, moving to block 256, the first battery disconnect BDU1 and switches 178A, 178B, 178C, 180B are actuated to an open position, and the second battery disconnect BDU2 and switches 180A, 180C are actuated to a closed position. When the first battery disconnect BDU1 and switches 178A, 178B, 178C, 180B are actuated to an open position, and the second battery disconnect BDU2 and switches 180A, 180C are actuated to a closed position, the first battery pack 174 is isolated and power is provided to the electric vehicle only from the second battery pack 176. The system will continue to operate within either block 254 or block 256, providing power only from either the first or second battery pack 174, 176, until the delta between the state of charge of the first battery pack 174 and the state of charge of the second battery pack 176 does not exceed the pre-determined threshold.

If at block 244, the system determines that both of the first and second battery packs 174, 176 are not healthy, moving from block 244 to block 258, the system sets a diagnostic code. Moving on to block 260, the system will evaluate the first battery pack 174. If the first battery pack 174 is healthy, then, moving to block 262, the first battery disconnect BDU1 and switches 178A, 178C are actuated to a closed position, and the second battery disconnect BDU2 and switches 178B, 180A, 180B, 180C are actuated to an open position. When first battery disconnect BDU1 and switches 178A, 178C are actuated to a closed position, and the second battery disconnect BDU2 and switches 178B, 180A, 180B, 180C are actuated to an open position, the second battery pack 176 is isolated and power is provided to the electric vehicle only from the first battery pack 174.

If the first battery pack 124 is not healthy, moving to block 264, the first battery disconnect BDU1 and switches 178A, 178B, 178C, 180B are actuated to an open position, and the second battery disconnect BDU2 and switches 180A, 180C are actuated to a closed position. When the first battery disconnect BDU1 and switches 178A, 178B, 178C, 180B are actuated to an open position, and the second battery disconnect BDU2 and switches 180A, 180C are actuated to a closed position, the first battery pack 174 is isolated and power is provided to the electric vehicle only from the second battery pack 176.

A high voltage electrical propulsion system architecture and method of the present disclosure offers several advantages. These include providing a configuration enabling direct current fast charging and incorporating solid state switches that have faster response time than electromechanical relays, have no moving parts and thus have no orientation issues or degradation issues over the lifecycle of the system, and are not prone to contact welding or contact bounce. The electrical propulsion system architecture and method of the present disclosure provides clean and fast switching of high voltage accessory load between multiple battery packs using solid state switches instead of mechanical contactors or DC-DC converters. The fast switching speed of the solid-state switches and higher reliability will enable the accessory load switching to take place safely and reliably avoiding any significant unbalance between multiple battery packs.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of controlling fast charging of a first battery pack and a second battery pack within a high voltage electrical propulsion system for an electric vehicle, comprising:

identifying an operating condition of the electrical propulsion system, wherein the operating condition is one of a first charging mode, a second charging mode and a propulsion mode, wherein, when in the first and second charging mode, the first and second battery packs of the electrical propulsion system are being charged and, when in the propulsion mode, power from the first and second battery packs is routed to electrical power components of the electrical propulsion system;

when the electrical propulsion system is in the first charging mode:

charging the first and second battery packs in the first charging mode by actuating a first plurality of switches to a closed state and actuating a second plurality of switches to an open state to initiate the first charging mode of the first and second battery packs;

terminating the first charging mode by actuating all of the first and second plurality of switches to the open state:

when there is a request to terminate the first charging mode; and when there is no request to terminate the first charging mode and the charging of the first and second battery packs in the first charging mode is complete; and when the electrical propulsion system is in propulsion mode, actuating the first plurality of switches to an open state and actuating the second plurality of switches to a closed state to connect the at least one battery pack to power components of the electrical propulsion system.

2. The method of claim 1, further including:

when the high voltage electrical propulsion system is in the second charging mode:

charging the first and second battery packs in the second charging mode;

terminating the second charging mode when there is a request to terminate the second charging mode; and terminating the second charging mode when there is no request to terminate the second charging mode and the charging of the first and second battery packs in the second charging mode is complete.

3. The method of claim 2, wherein charging the first and second battery packs in the second charging mode includes actuating a third plurality of switches to a closed state and actuating a fourth plurality of switches to an open state to initiate the second charging mode of the first and second battery packs; and terminating the second charging mode includes actuating all of the third and fourth plurality of switches to the open state to terminate the second charging mode.

4. The method of claim 3, further including, when the electrical system is in propulsion mode:

monitoring a state of charge of each of the first and second battery packs;

providing power to power components within the electric vehicle from the first battery pack when the state of charge of the first battery pack is greater than the state of charge of the second battery pack; and providing power to power components within the electric vehicle from the second battery pack when the state of charge of the second battery pack is greater than the state of charge of the first battery pack.

5. The method of claim 4, further including:

providing power to power components within the electric vehicle from only the first battery pack when:

both of the first and second battery packs are healthy;

power demand of the electric vehicle does not exceed a pre-determined threshold value;

a delta between the state of charge of the first battery pack and the second battery pack exceeds a pre-determined threshold; and the state of charge of the first battery pack is greater than the state of charge of the second battery pack; and providing power to power components within the electric vehicle from only the second battery pack when:

both of the first and second battery packs are healthy;

power demand of the electric vehicle does not exceed a pre-determined threshold value;

the delta between the state of charge of the first battery pack and the second battery pack exceeds a pre-determined threshold; and the state of charge of the second battery pack is greater than the state of charge of the first battery pack.

6. The method of claim 5, wherein the pre-determined threshold for the delta between the state of charge of the first battery pack and the second battery pack is between 0% and 10%.

7. The method of claim 6, further including:

obtaining temperature, voltage and current information for cells within the first and second battery packs from sensors within the first and second battery packs;

calculating voltage and current within each of the first and second battery packs; and estimating the state of charge of each of the first and second battery packs.

8. The method of claim 7, wherein providing power to power components within the electric vehicle from only the first battery pack further includes actuating a fifth plurality of switches to an open state and actuating a sixth plurality of switches to a closed state to provide power to power components within the electric vehicle from the first battery pack and to disconnect power components within the electric vehicle from the second battery pack; and providing power to power components within the electric vehicle from only the second battery pack further includes actuating a seventh plurality of switches to an open state and actuating an eighth plurality of switches to a closed state to provide power to power components within the electric vehicle from the second battery pack and to disconnect power components within the electric vehicle from the first battery pack.

9. The method of claim 8, further including, when the power demand of the electric vehicle exceeds the pre-determined threshold value, actuating the first plurality of switches to an open position and actuating the second plurality of switches to a closed state to provide power to power components within the electric vehicle from both the first battery pack and the second battery pack.

10. The method of claim 9, further including, when the power demand of the electric vehicle does not exceed the pre-determined threshold value and the delta between the state of charge of the first battery pack and the second battery pack does not exceed the pre-determined threshold, actuating the first plurality of switches to an open position and actuating the second plurality of switches to a closed state to provide power to power components within the electric vehicle from both the first battery pack and the second battery pack.

11. The method of claim 10, further including, when the high voltage electrical propulsion system is in propulsion mode and one of the first and second battery packs is not healthy:

setting a diagnostic code;

providing power to power components within the electric vehicle from the first battery pack and disconnecting power components within the electric vehicle from the second battery pack when the first battery pack is healthy; and providing power to power components within the electric vehicle from the second battery pack and disconnecting power components within the electric vehicle from the first battery pack when the first battery pack is not healthy.

12. A high voltage electrical propulsion system architecture for an automotive vehicle comprising:
- a direct current fast charging unit;
- a plurality of power components;
- at least one battery pack;
- at least one switch adapted to selectively connect the at least one battery pack to one of the direct current fast charging unit and the power components within the automotive vehicle, wherein, at least one of the at least one switch is a solid-state switch in functional engagement with a current sensor, the solid-state switch and the current sensor adapted to precisely limit a fault current of the solid-state switch, the solid-state switch further adapted to allow ramping of a pulse width modulation (PWM) duty cycle of a control signal to limit an inrush of current when the at least one battery pack is initially connected to a load with capacitive input.

13. The high voltage electrical propulsion system architecture of claim 12, wherein the at least one switch includes:
- a first plurality of switches, the first plurality of switches defining a charging circuit when each of the first plurality of switches are closed; and
- a second plurality of switches, the second plurality of switches defining a power circuit when each of the second plurality of switches are closed.

14. The high voltage electrical propulsion system architecture of claim 13, further including at least one hybrid switch comprising a solid-state switch in parallel with a mechanical contact switch.

15. The high voltage electrical propulsion system architecture of claim 14, wherein at least one of the at least one switch is a single pole double throw mechanical switch.

16. The high voltage electrical propulsion system architecture of claim 14, further including a dedicated pre-charge circuit.

17. The high voltage electrical propulsion system architecture of claim 12, wherein the at least one battery pack includes a first battery pack and a second battery pack, the electrical propulsion adapted to operate in one of an 800 volt charging mode, a 400 volt charging mode and a propulsion mode.

* * * * *